US006952737B1

(12) United States Patent
Coates et al.

(10) Patent No.: US 6,952,737 B1
(45) Date of Patent: Oct. 4, 2005

(54) METHOD AND APPARATUS FOR ACCESSING REMOTE STORAGE IN A DISTRIBUTED STORAGE CLUSTER ARCHITECTURE

(75) Inventors: Joshua L. Coates, Orinda, CA (US); Patrick E. Bozeman, San Francisco, CA (US); David A. Patterson, Kensington, CA (US)

(73) Assignee: Intel Corporation, Santa Clara, CA (US)

( * ) Notice: Subject to any disclaimer, the term of this patent is extended or adjusted under 35 U.S.C. 154(b) by 824 days.

(21) Appl. No.: 09/753,221

(22) Filed: Dec. 29, 2000

Related U.S. Application Data

(63) Continuation-in-part of application No. 09/695,499, filed on Oct. 23, 2000.
(60) Provisional application No. 60/186,693, filed on Mar. 3, 2000, and provisional application No. 60/186,774, filed on Mar. 3, 2000.

(51) Int. Cl.[7] .......................... G06F 15/16; G06F 12/00
(52) U.S. Cl. ....................... 709/229; 711/100; 711/114; 710/74
(58) Field of Search ........................ 709/229; 710/1–5, 710/33, 74; 711/100, 114, 3–6, 11

(56) References Cited

U.S. PATENT DOCUMENTS

| 5,497,422 A | * | 3/1996 | Tysen et al. ................. 713/157 |
| 5,506,984 A | | 4/1996 | Miller |
| 5,692,155 A | | 11/1997 | Iskiyan et al. |

(Continued)

FOREIGN PATENT DOCUMENTS

WO    WO 01/66707 A2    9/2001

OTHER PUBLICATIONS

Distributed File Systems for Storage Area Networks, Kline, B., Advanced Digital Information Corp. pp. 1–11.*
Mogul, RFC0917: Internet subnets, 1984, ACM, pp. 1–17.
Microsoft Press, Computer Dictionary Third Edition, 1997, p. 337.
Certificate to LDAP Mapping in Netscape Servers, Structure Arts Technical Notes Computing Corp. TN–970801, Aug. 97, pp. 1–5.*
Apache–SSL: Certificates, Configuration and More Information Systems & Tech. Univ. of Waterloo, Sep. 1998, pp. 1–8.*
Implementing Multi–Protocol Authentication/Security Systems; Grid (GSI) Secure Socket Layer (X.509 Certificates), Kerberos, DCE & Customs Systems for Secute Distributed Data Access, Jul. 1999, Schroeder, W., pp. 1–5.*
Using WebLogic SSL, BEA WebLogic Server 4.5, BEA Systems, Inc., Sep. 1999, pp. 1–20.*

*Primary Examiner*—Beatriz Prieto
(74) *Attorney, Agent, or Firm*—Libby H. Hope

(57) ABSTRACT

A network storage system includes a virtual file system ("VFS") that manages the files of the network storage system, and a storage center that stores the files. The VFS and the storage center are separated, such that a client accesses the VFS to conduct file system operations and the client accesses the storage center to upload/download files. The client accesses the network storage system through one or more storage ports. The storage center includes a plurality of distributed object storage managers (DOSMS) and a storage cluster that includes a plurality of intelligent storage nodes. The network storage system includes additional storage centers at geographically disparate locations. The network storage system uses a multi-cast protocol to maintain file information at the DOSMs regarding files stored in the intelligent storage nodes, including files stored in disparate storage centers.

16 Claims, 32 Drawing Sheets

U.S. PATENT DOCUMENTS

| | | | |
|---|---|---|---|
| 5,757,920 A * | 5/1998 | Misra et al. | 713/158 |
| 5,805,699 A * | 9/1998 | Akiyama et al. | 705/58 |
| 5,870,537 A | 2/1999 | Kern et al. | |
| 5,937,406 A | 8/1999 | Balabine et al. | |
| 5,948,062 A | 9/1999 | Tzelnic et al. | |
| 5,978,577 A | 11/1999 | Rierden et al. | |
| 6,081,883 A | 6/2000 | Popelka et al. | |
| 6,148,349 A * | 11/2000 | Chow et al. | 710/33 |
| 6,170,013 B1 | 1/2001 | Murata | |
| 6,173,374 B1 * | 1/2001 | Heil et al. | 711/148 |
| 6,236,999 B1 | 5/2001 | Jacobs et al. | |
| 6,256,673 B1 | 7/2001 | Gayman | |
| 6,263,402 B1 | 7/2001 | Ronstrom et al. | |
| 6,304,980 B1 | 10/2001 | Beardsley et al. | |
| 6,314,465 B1 | 11/2001 | Paul et al. | |
| 6,324,581 B1 | 11/2001 | Xu et al. | |
| 6,327,614 B1 | 12/2001 | Asano et al. | |
| 6,351,775 B1 * | 2/2002 | Yu | 709/238 |
| 6,356,929 B1 | 3/2002 | Gall et al. | |
| 6,360,306 B1 | 3/2002 | Bergsten | |
| 6,393,466 B1 * | 5/2002 | Hickman et al. | 709/214 |
| 6,438,125 B1 | 8/2002 | Brothers | |
| 6,442,548 B1 | 8/2002 | Bealabine et al. | |
| 6,553,376 B1 | 4/2003 | Lewis et al. | |
| 6,553,389 B1 | 4/2003 | Golding et al. | |
| 6,611,869 B1 * | 8/2003 | Eschelbeck et al. | 709/228 |
| 6,622,247 B1 * | 9/2003 | Isaak | 713/155 |
| 6,704,838 B2 * | 3/2004 | Anderson | 711/114 |

* cited by examiner

Customer Table

|  | Customer Name | Customer Reserved Fields |
|---|---|---|
|  | Customer A | [Customer stores data ...] |
|  | Customer B | [Customer stores data ...] |
|  | Customer C | [Customer stores data ...] |
|  | Customer D | [Customer stores data ...] |

1200

Folder Table

| Customer Id | Folder Id | Folder Parent Id | Metadata |
|---|---|---|---|
| 3 | 2 | - | [Reserved] |
| 3 | 100 | 2 | [Reserved] |
| 3 | 251 | 2 | [Reserved] |
| 3 | 166 | 251 | [Reserved] |

1210

File Table

| Customer Id | File Handle | Folder Id | Folder Parent Id | Metadata |
|---|---|---|---|---|
| 3 | 52.MD5 | 100 | 2 | [Reserved] |
| 3 | 55.MD5 | 100 | 2 | [Reserved] |
| 3 | 99.MD5 | 166 | 251 | [Reserved] |
| 3 | 67.MD5 | 166 | 251 | [Reserved] |

METHOD AND APPARATUS FOR ACCESSING REMOTE STORAGE IN A DISTRIBUTED STORAGE CLUSTER ARCHITECTURE

CROSS-REFERENCES TO RELATED APPLICATIONS

This application is a continuation-in-part of U.S. patent application Ser. No. 09/695,499, filed Oct. 23, 2000, entitled "A Network Storage System," and claims the benefit of U.S. Provisional Patent Application Serial Nos. 60/186,693 and 60/186,774, filed Mar. 3, 2000, entitled "Method and Apparatus for Implementing A Network-Based Storage Service" and "Method and Apparatus for Establishing Control and Data Lines To A Storage Facility, And API For Supporting Such Lines." respectively.

BACKGROUND OF THE INVENTION

1. Field of the Invention

The present invention is directed toward the field of storage, and more particularly toward accessing remote storage through use of a local device.

2. Art Background

With the rapid digitization of music, film and photographs, customer demand is driving the Internet to become the most preferred transport mechanism for all forms of digital media. Using the Internet, users have instantaneous worldwide access to their favorite movies, songs, or personal memorabilia. As the producers and owners of media content increasingly use the Internet as a primary method for worldwide distribution, the aggregate amount of rich media content available over the Internet is increasing at an extremely rapid rate.

Not only is the number of rich media objects available over the Internet growing exponentially, but the size of the media, generally referred to herein as objects, is also dramatically increasing. A median Web object is 5 kilobytes (KB) in size, while the size of a rich media object may be 100 to 1 million times larger. For example, high-resolution digital photographs average 500 KB per picture. Digital music runs 3 to 5 megabytes ("MB") per song, and digital movies may reach up to 4 gigabytes ("GB") in size.

As the number of personal computers, digital camcorders, digital cameras, and personal digital audio players grow, demand for Internet bandwidth to store, share and retrieve media files across the Internet also will grow. As the use of high-bandwidth digital subscriber lines ("DSL"), cable modems, and digital broadcast satellite networks gain in popularity, which supports the growth of the Internet backbone, the demand for using the Internet as a primary delivery channel for rich media objects also gains in popularity. This development causes a virtuous cycle, where the installation of broadband networks drives the use of rich media devices, which in turn, creates demand for further improvements in network bandwidth, and so on.

The distribution of rich media objects across the Internet creates the need for increased storage capacity to store these rich media objects. As the number of personal media devices grows, and the network bandwidth expands, the amount of storage media required to store the various MP3 files, photographs, films, and video clips will also grow. Also, as more storage becomes readily available, more people will use the Internet to catalog, store, and access their rich media objects (e.g., digital photographs of family members).

To date, only traditional storage solutions from established enterprise vendors have been available to a Web site developer implementing rich media repositories. One challenge with adopting today's existing storage technology for use with the Internet is meeting current and future scalability requirements. Today, large scale storage systems only scale to a few dozen terabytes. This amount of storage space is inadequate for storing substantial amounts of rich media objects. For example, if just 10 percent of America on line ("AOL") users place two 15 minute videos on a personal home page, then one petabyte (i.e., 1000 terabytes) of storage would be required. Today's enterprise storage system architectures cannot support this level of storage capacity.

In the Internet world, in addition to providing mass storage, it is also critically important to provide universal access to that storage across the wide area network. The content provider, regardless of the location of their content servers, cache servers, or stream servers, would ideally like to provide ubiquitous access to an entire store of rich media objects. Current technology, including storage area networks and network attached storage technologies, do not provide direct access to the wide area network. Only servers located within the same metropolitan area can directly access these types of storage systems.

Since Internet users are measured in the tens of thousands or even millions of users, instead of hundreds of users, another challenge in mass storage is the ability to scale delivery of media as the demand increases. A true Internet based storage system must be able to handle peak loads of millions of simultaneous requests from all around the world. Traditional storage architectures are designed to support a few hundred simultaneous requests from the fastest possible response time to match the speed of the server CPU. For the Internet, storage systems must be able to manage literally millions of simultaneous downloads at the speed of the wide area network. Thus, these traditional storage architectures are not "impedance matched" with the wide area network because the storage devices handle far too few simultaneous transactions that far exceed the latency requirements of the wide area network. In addition, these traditional storage architectures are typically implemented with expensive disks and expensive connection technologies.

Another issue regarding storage of rich media objects is the time to market. The time to market is often a crucial requirement for new rich media Web sites. Growth rates are measured in terabytes per month. Quickly bringing new capacity online becomes a strategic advantage in fast-moving markets. Typically, with traditional storage solutions, it takes a customer two to six months to integrate a fully operational multi-terabytes storage unit with the content providers site. This start-up time is to slow to meet rapidly increasing business demands. Pre-building large amounts of excess capacity in anticipation of this demand is one tactic to deal with unpredictable demand spikes, but this approach is prohibitively expensive.

Traditional storage architectures have been optimized for database and file server applications. The Internet introduces a whole new set of demands on storage devices, including scalability, global access, user accounts, and rapid deployment. With the explosive growth in rich media served over the Internet over the next several years, this is coming to a head. The coming title wave of rich content will surpass the capabilities of even the most robust enterprise storage architectures. Accordingly, there is a demand to develop new paradigms in new ways of designing Internet ready rich media storage systems.

SUMMARY OF THE INVENTION

A storage system, accessed over a network by a client, includes one or more storage centers. A storage center contains a control nodes (e.g., distributed object storage managers) and a plurality of intelligent storage nodes. The intelligent storage nodes store the object files in one or more disk drives. The client, such as an end-user computer or a content server, issues requests over a network (e.g., Internet) to retrieve object files. In response to a client request, a control node is selected to manage the file retrieval process. In one embodiment, a load balancing fabric, such as an L4 switch, receives the request from the network, and selects one of the control nodes in manner so as to load balance client requests in the storage system. The control node determines the location of the object file in one of the intelligent storage nodes ("destination storage node"). The control node receives the object file from the destination storage node, and transfers the object file to the client. In one embodiment, the control nodes include a data cache to store object files previously retrieved from an intelligent storage node.

The client request contains a unique file identifier (e.g., object fingerprint) that uniquely identifies an object file for the client request. The storage system identifies the object file in the storage system through the object fingerprint. In one embodiment, the storage system authenticates client requests. The client request includes, in addition to a unique file identifier, a client identification and a certificate. The storage system stores a client "secret", such as a client key. The control node retrieves a client key, which corresponds to the client identification, and validates the certificate using the client key. If the client request is valid, then the control node retrieves the object file. If the client request is not valid, then an error message is sent to the client.

In one embodiment, the control node stores a reference (e.g., look-up table) that cross references object files to intelligent storage node locations. In response to a client request, the control node determines whether the object file is identified on the reference. If so, the control node, through an interconnect fabric, retrieves the object file from the identified intelligent storage node. If the object file is not identified in the reference, then the control node, using a multi-cast protocol (e.g., DOSP), broadcasts a request for the object file to the intelligent storage nodes. Each intelligent storage node determines whether it stores the object file. If it does, the intelligent storage node broadcasts, to all of the control nodes, the intelligent storage node location for the object file. The control nodes update their reference with the intelligent storage node location. If the control node is unsuccessful using the multi-cast broadcast, then the control node individually queries each intelligent storage node for the object file using a point-to-point protocol.

In one embodiment, the storage system includes more than one storage center (i.e., each storage center contains control nodes and intelligent storage nodes). The storage centers may be located at geographically disparate locations. The storage system stores an object file at two different storage centers. For this embodiment, if a failure occurs in an intelligent storage node, then the DOSM searches for the object file in a different storage center. Also, in other embodiments, a storage center stores an object file in more than one intelligent storage node.

BRIEF DESCRIPTION OF THE DRAWINGS

FIG. 12 illustrates example database tables for implementing the file system with a database.

DETAILED DESCRIPTION

The disclosure of U.S. Provisional Patent Applications Nos. 60/186,693 and 60/186,774, filed Mar. 3, 2000, entitled "Method and Apparatus for Implementing A Network-Based Storage Service" and "Method and Apparatus for Establishing Control and Data Lines To A Storage Facility, And API For Supporting Such Lines", respectively, are hereby incorporated by reference.

Network Storage System Overview

The network storage system is designed to meet the storage requirements of rich media content owners. Rich media objects typically represent up to 90 percent of the storage required for a film, music or a photo album associated with a web site. The network storage system uses distributed systems technology to provide scalability to support petabytes of storage and to support millions of users. Users only gain access to their media objects, within the network storage system, using a highly secured "shared secret" authentication certificate technology. The network storage system also provides immediate expandability for any user that desires to increase their storage capacity. Also, the network storage system is extremely cost-effective because, in one embodiment, it consists of standard off the shelf CPUs with the latest high-density disk technology.

For purposes of nomenclature, the term "client", as used herein, refers to an entity that uses the storage system to store object files. For example, a client may consist of a web site owner that desires to deliver, outside their web server, rich media objects associated with content on their web site. Also, for purposes of nomenclature, the term "end-user", as used herein, refers to a recipient of the object. For example, the end-user may consist of a computer user that downloads objects from a web site across the Internet using a web browser. Also, under this definition, the end-user may also be a client.

Figure 1:
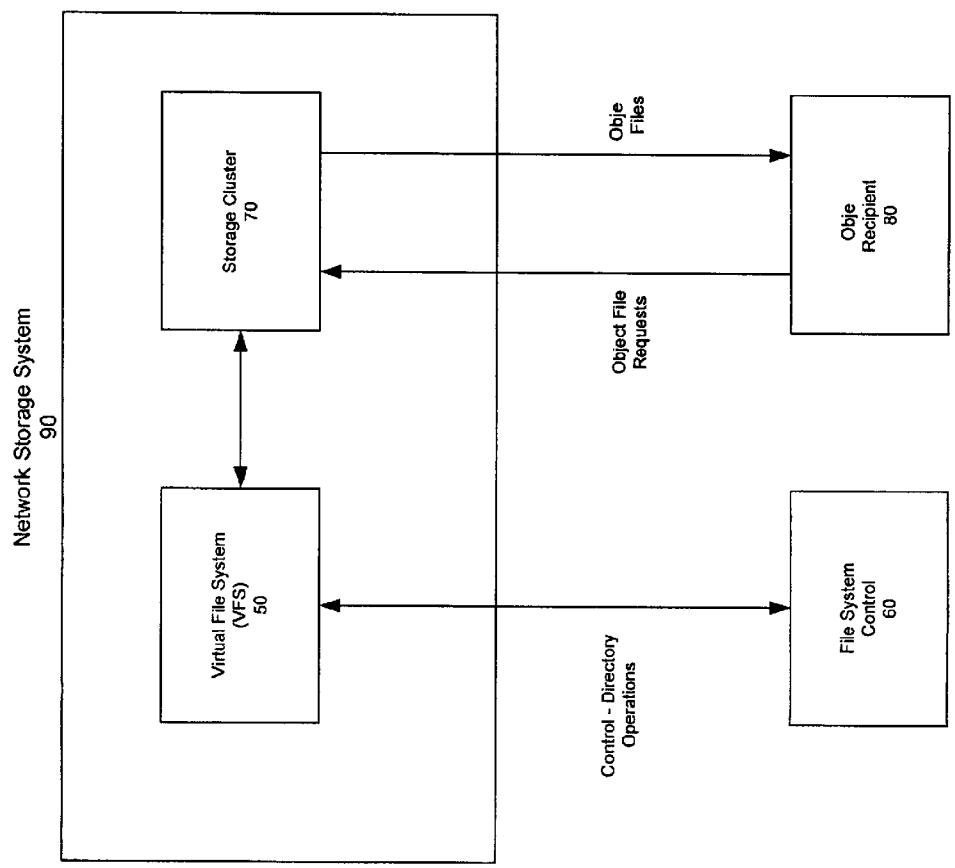
FIG. 1 is a block diagram illustrating one embodiment for the storage system of the present invention.

FIG. 1 is a block diagram illustrating one embodiment for the storage system of the present invention. For the embodiment of FIG. 1, the storage system consists of a control path and a data path. The control path consists of a virtual file system ("VFS") 50 and the data path consists of a distributed storage cluster 70. The control path is used to conduct all directory operations. The VFS includes, in part, client assigned filenames and network storage system assigned unique file identifiers for each rich media object. The unique file identifiers are embedded into storage resource locators ("SRLs").

The distributed storage cluster 70 is used to store the object files for the system (i.e., all client data). As shown in FIG. 1, the VFS and the storage cluster 70 are coupled to communicate information so as to coordinate file system information with the physical storage of the object files.

As shown in FIG. 1, file system control 60 issues directory operation requests to the VFS 50. As is described more fully below, file system control 60 may comprise software that uses a library to essentially "translate" file system requests from the client's local file system to file system requests compatible with the network storage system. In other embodiments, file system control 60 consists of a storage port coupled to the client's system (e.g. the client's application or web server). In general, the storage port, implemented in either hardware or software, translates file system commands from the client's local file system (e.g., NFS or CIFS) to file system requests compatible with the network storage system. In one embodiment, to interface the client's file system to the network storage system, a client need only mount the storage port as a network drive. The storage port then provides complete access to the network storage system. A detailed discussion of the storage port is set forth below.

As shown in FIG. 1, object recipient 80 receives, in response to object requests, objects downloaded from storage cluster 70. The object recipient 80 may comprise the client, or the object recipient 80 may consist of one or more end-users. Embodiments for transferring objects from the storage cluster 70 to object recipients, including both end-users and clients, are described more fully below.

Figure 2:
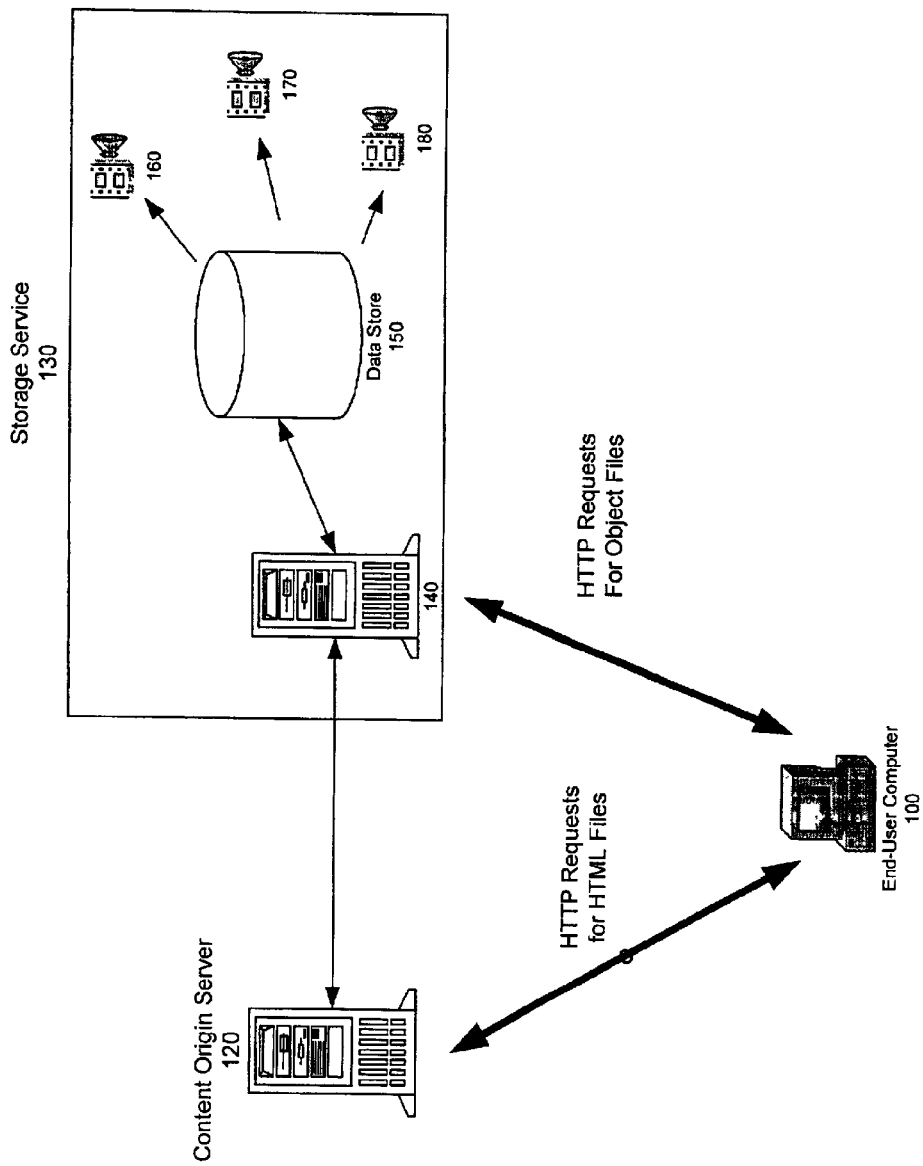
FIG. 2 illustrates one embodiment for use of the network storage system as a media storage service.

The network storage system has applications for use as an Internet based media storage service. For this application, the network storage system is an integral part of the Internet infrastructure used by rich media content owners and delivery networks. FIG. 2 illustrates one embodiment for use of the network storage system as a media storage service. In general, the storage service 130 provides a single consistent worldwide image of a client's (e.g., a company operating a web site) entire directory of rich objects. For this embodiment, an end-user 100 is coupled to both the content origin server 120 and storage service 130 through a network. For example, the end-user 100 may be coupled to the content origin server 120 and storage service 130 via the Internet. The storage service 130 includes processing and networking facilities, such as a server 140, and data store 150. The storage service 130 and content origin server 120 communicate to conduct file directory operations and object file operations. The data store 150, part of the storage service 130, stores large data files, such as rich media data files, illustrated as multimedia files 160, 170 and 180 in FIG. 2. In one embodiment, the data store 150 consists of a cluster of intelligent storage nodes.

In one embodiment, the storage service communicates with web servers (e.g., content origin server 120) and browsers (e.g., Microsoft Explorer or Netscape Navigator) operating on end-user computer 100 via the standard Internet hypertext transfer protocol ("HTTP") and universal resource locators ("URLs"). Although the use of HTTP is described herein, any transport protocol may be used without deviating from the spirit or scope of the invention. For the configuration of FIG. 2, the end-user, through end-user computer 100, generates hyper text transfer protocol ("HTTP") requests to the content origin server 120 to obtain hyper text mark-up language ("HTML") files. In addition, to obtain large data objects associated with those text files, the end-user, through end user computer 100, generates HTTP requests to the storage service 130. For example, the end-user may download from the content origins server 120 a few kilobytes of textual data describing a rich object, such as text describing an upcoming film. When the user "clicks" on a URL to download a film snippet from the upcoming film, an HTTP request is generated to the storage service 130, and a storage service 130 downloads the film snippet to the end-user computer 100. The network configuration of FIG. 2 permits off loading the storage of rich objects from the content origin server 120 to the storage service 130. This configuration greatly reduces the size and complexity of content origin servers needed to store, manage and serve rich objects to end-users.

Distributed Storage Cluster

Figure 3:
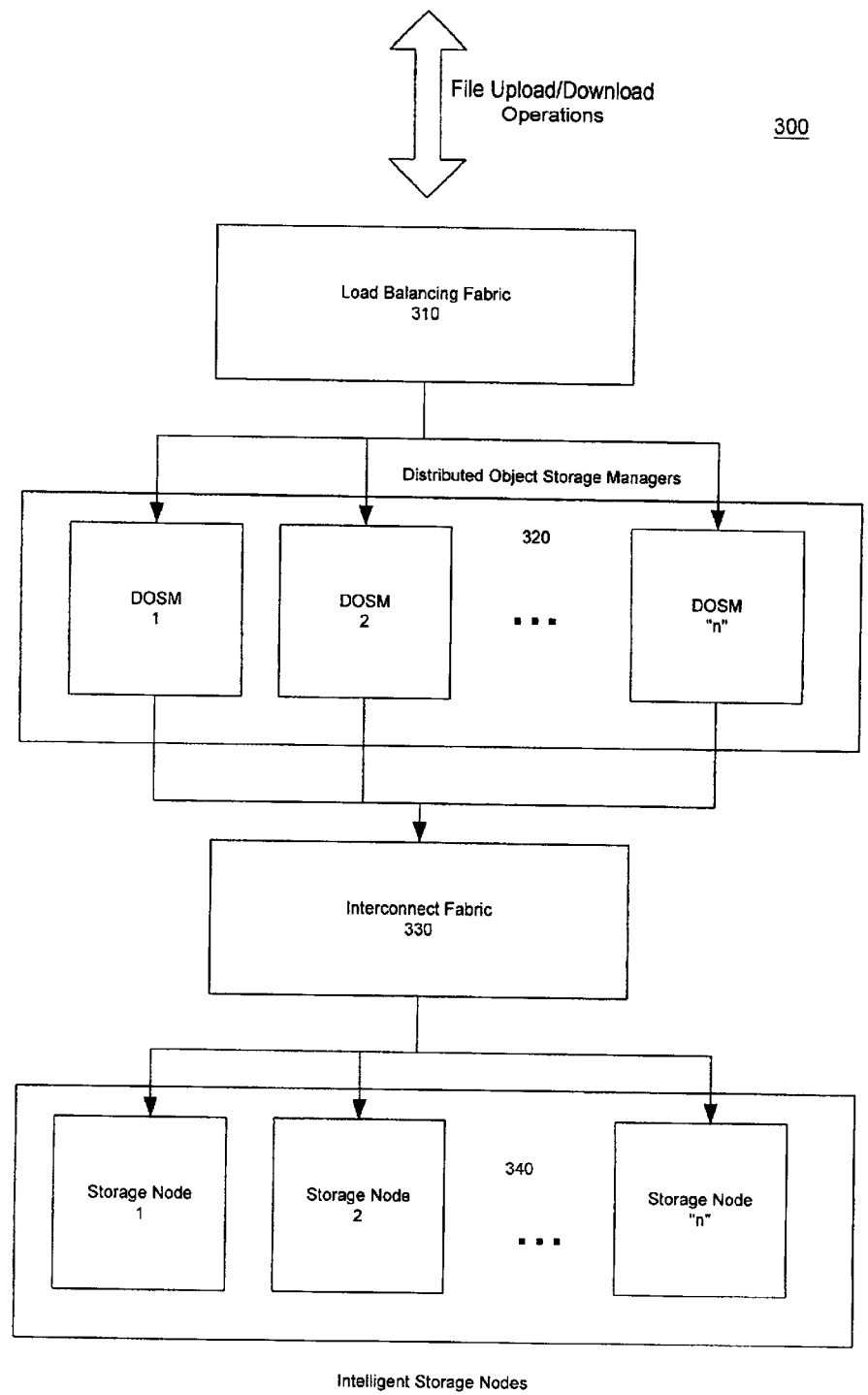
FIG. 3 is a block diagram illustrating one embodiment for the storage cluster.

In one embodiment, the storage cluster utilizes distributed systems technology that harnesses the throughput of hundreds of CPUs and the storage of thousands of disk drives. FIG. 3 is a block diagram illustrating one embodiment for the storage cluster. The storage cluster 300 receives upload, download, and delete operations that include the storage resource locator ("SRL"). The SRL is then used to uniquely identify a client file. As shown in FIG. 3, the storage cluster consists of distributed object storage managers ("DOSMs") 320 and intelligent storage nodes 340. There are "n" distributed object storage managers 320, wherein "n" is any integer value greater than one. Similarly, there are "n" intelligent storage nodes for the intelligent storage nodes 340 component (i.e., wherein "n" is also any integer value greater than one).

As shown in FIG. 3, file upload and download operations are input to a load balancing fabric 310. In one embodiment, the load balancing fabric 310 is a layer four ("L4") switch. In general, L4 switches are capable of effectively prioritizing TCP and UDP traffic. In addition, L4 switches, which incorporate load balancing capabilities, distribute requests for HTTP sessions among a number of resources, such as servers. For this embodiment, the load balancing fabric 310 distributes upload and download requests to one of a plurality of DOSMs based on DOSM availability. The load balancing capability in an LA switch is currently commercially available.

Each DOSM independently handles hundreds of simultaneous download transactions. In one embodiment described below, each DOSM has a local high-speed disk cache to store frequently accessed file objects. Each DOSM has a map, dynamically generated, of the storage system. The map identifies a correspondence between an intelligent storage node address and an object finger print. In one embodiment, the DOSMs record all usage and performance data gathered by a separate accounting system and monitoring system.

The DOSMs 320 communicate with the intelligent storage nodes 340 via an interconnect fabric 330. The interconnect fabric 330 consists of a high-speed, high bandwidth fabric to ensure that all the DOSMs 320 communicate with every intelligent storage node at all times. In one embodiment, the DOSMs 320 communicate with the intelligent storage node over the interconnect fabric via a protocol, entitled the distributed object storage protocol ("DOSP"). Effectively, the DOSP links hundreds of intelligent storage nodes into one large storage cluster. As described more fully below, the DOSP consist of a multi-cast protocol as well as a point-to-point protocol.

In general, the intelligent storage nodes 340 provide the persistent store for the objects or files. The intelligent storage nodes contain thousands of high-density disk drives. The intelligent storage nodes are described more fully below in conjunction with the discussion of FIG. 7.

In one embodiment, the network storage system uses the storage resource locators ("SRLs") to process requests. In one embodiment, the network storage system uses the following format for the SRL:
http://<storage-cluster>/<encoded-request>/<digital-signature>/<arbitrary-customer-uri,
wherein:
  the "storage-cluster" field includes the name or IP address of a storage center DSM pool;
  the "encoded-request" field comprises a base 64 encoded op code and arguments;
  the "digital-signature" field consists of a certificate derived from the following expression: md5(shared-secret+md5(shared-secret+encoded-request)); and
  the "arbitrary-customer-uri" field contains arbitrary information added to the SRL by the network storage system clients. For example, the arbitrary-customer-uri field may include the filename and extension of the file being downloaded to enable browsers to send the content to an appropriate plug-in.

In one embodiment, the "encoded request" field is encoded using base64 encoding. As shown in Table 1, the encoded request consists of a URL type field, a version field, and type/version specific payload field.

TABLE 1

| Field | Datatype | Comment |
|---|---|---|
| Type | Numeric | Type of the URL, i.e. Standard, CDN, etc. |
| Version | Numeric | Version of the URL |
| Payload | NA | Payload specific to the Type/Version of the URL. |

In one embodiment, the type/version specific payload field consists of a series of '/' delimited fields that contain accounting information, an op code, and an op code dependent argument list. Table 2 shows one embodiment for the type/version specific payload field.

TABLE 2

| Field | Datatype | Comment |
|---|---|---|
| Expires | Numeric | Number of seconds since the epoc that the link expires. If 0, the link has an infinite duration and will not be checked for expiration. |
| Access method | Numeric | The access method associated with the SRL, i.e. Storage Port, end user SRL, CDN, etc. |
| Client Id | Numeric | The client id of the client performing the operation. |
| Op Code | Numeric | The opcode of the operation to be performed. |
| Arguments | NA | An opcode specific argument list. |

Table 3 includes two access method types for the access method field.

TABLE 3

| Access method | Encoding | Comment |
|---|---|---|
| SRL | 0x0001 | End user SRL request. |
| Storage Port | 0x0002 | Internal Storage Port request. |

Table 4 includes operational codes for the op code field.

TABLE 4

| Operation | Encoding | Arguments |
|---|---|---|
| NO_OP | 0x0000 | None |
| STORE | 0x0010 | Pfid - numeric Parent folder id to upload the file to. Other arguments are mime encoded. |
| FETCH | 0x0020 | Md5 - alphanumeric Hexadecimal representation of the md5 hash of the file to be downloaded. |
| FETCH_AUTH | 0x0021 | Md5 - alphanumeric Hexadecimal representation of the md5 hash of the file to be downloaded. Authentication Callback URI - alphanumeric URL encoded callback URI |
| DELETE | 0x0050 | Md5 - alphanumeric Hexadecimal representation of the md5 hash of the file to be deleted. |
| CONTROL | 0x1000 | ControlTicket - alphanumeric Hexadecimal representation of the digital signature of the XML control document. |

The object files, stored in one or more storage clusters, are not associated with a "central authority" that specifies a physical location for the object files. The VFS, in part, stores an object fingerprint for a file, but does not indicate a location for the file. Because of this, the network storage system may be referred to as a "stateless" or a "soft state" system. Instead of using a central authority to locate files, the physical address for the files is identified in the storage cluster through a dynamically generated reference. However, the reference does not necessarily identify the location for all the object files (ie., the reference, at any one time, potentially identifies only a subset of the object files in the system). Since the network storage system does not use a central authority, object files may be added, updated or stored in multiple locations in the storage system, and the location of the object files in the intelligent storage nodes may be discovered in response to a specific request.

Figure 4:
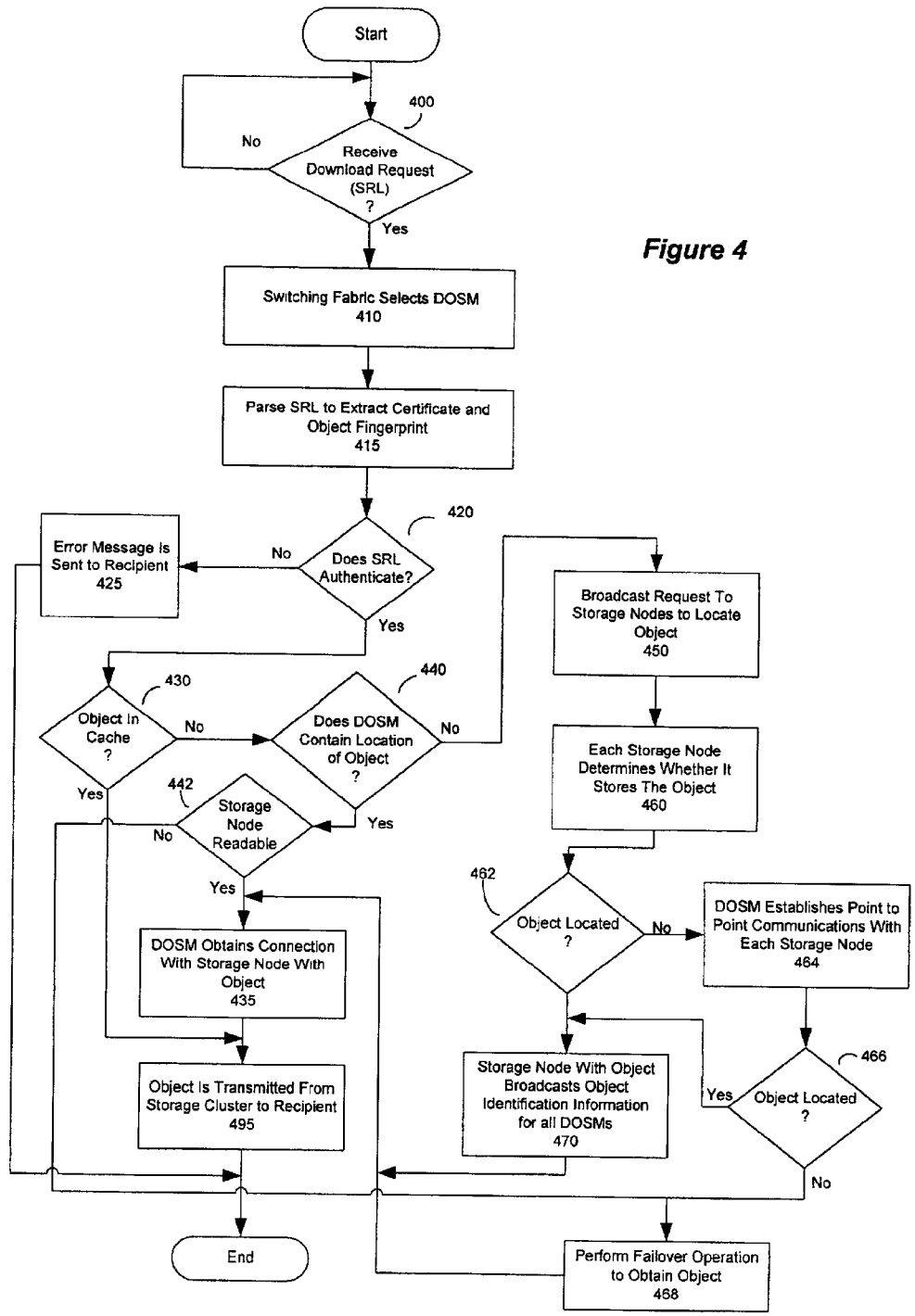
FIG. 4 is a flow diagram illustrating one embodiment for the download operation in the storage cluster.

FIG. 4 is a flow diagram illustrating one embodiment for the download operation in the storage cluster. For purposes of nomenclature, the "recipient" in a download operation is the destination of the file for the download operation. The storage cluster receives a download request, including the unique file identifier (e.g., SRL) (block 400, FIG. 4). When the storage cluster receives a download request, the load balancing fabric 310 (FIG. 3), such as an L4 switch, selects an available DOSM (block 410, FIG. 4). The DOSM parses the SRL to extract the certificate and the encoded request (block 415, FIG. 4). From the encoded request, a certificate is calculated, and the calculated certificate is compared to the SRL certificate. If the SRL does not authenticate, then an error message is sent to the recipient (blocks 420 and 425, FIG. 4). Alternatively, if the SRL does authenticate, then the DOSM determines whether the object identified by the SRL resides in the corresponding DOSM's data cache (blocks 420 and 430, FIG. 4). If the data object is cached, then the object is transmitted from the storage cluster to the recipient (e.g., via the Internet using HTTP protocol) (blocks 430 and 495, FIG. 4). If the object is not cached at the DOSM, then the DOSM attempts to identify the location of the object in one of the intelligent storage nodes (blocks 430 and 440, FIG. 4).

If the DOSM knows the location of the object (e.g., the object file is an entry in the DOSM look-up table) and the storage node is readable, then the DOSM obtains a connection with the storage node that stores the object, and transmits the object from the storage cluster to the recipient (blocks 442, 435 and 495, FIG. 4). In one embodiment, to determine whether the storage node is readable, the DOSM queries the storage node for the object file a predetermined number of times. Alternatively, if the DOSM does not know the storage location of the object in the intelligent storage nodes, then the DOSM broadcasts a request to the intelligent storage nodes to locate the object (blocks 440 and 450, FIG. 4). Each intelligent storage node determines whether the object is stored on one of its disk drives (block 460, FIG. 4). If the object file is located in one of the intelligent storage nodes, then the intelligent storage node, which stores the requested object, broadcasts identification information to all of the distributed object storage managers (blocks 462 and 470, FIG. 4). For example, if intelligent storage node "1" of intelligent storage nodes 340 stores the requested object in disk "3", then intelligent storage node "1" broadcasts to all "n" DOSMs that the object file is located in disk "3" of intelligent storage node "1." All DOSMs snoop the packets on the network to obtain file identification information. In response to the intelligent storage nodes broadcast, each DOSM updates its reference (e.g., lookup table or file system directory) with the proper file identification information.

If the DOSM broadcasts a request to the intelligent storage nodes to locate the object and the object is not located from the request, then the DOSM establishes a point-to-point connection with an intelligent storage node to individually query the storage node for the object (blocks 462 and 464, FIG. 4). This process is repeated until all intelligent storage nodes have been queried or the object has been located. If the object is located in one of the intelligent storage nodes, then the intelligent storage node, which stores the requested object, broadcasts identification information to all of the distributed object storage managers (blocks 466 and 470, FIG. 4). Alternatively, if the object is not located in one of the intelligent storage nodes, then a failover procedure is executed to locate the object in a different storage center (blocks 466 and 468, FIG. 4).

When the intelligent storage node is located, the DOSM obtains a connection with the intelligent storage node, and opens the file with the requested object. If the storage node is readable (i.e., the DOSM successfully reads the file from the storage node), then the object is transmitted from the intelligent storage node to the recipient via a network (e.g., using HTTP protocol over the Internet). If the object file is not readable, then a failover procedure is executed to obtain the object in a different storage node and/or storage center, and the DOSM obtains a connection with the new storage node (blocks 442, 468 and 435, FIG. 4). Thereafter, the object is transmitted from the storage cluster to the recipient (block 495, FIG. 4).

In one embodiment, accesses to the network storage system require a valid authentication certificate. In one embodiment utilizing CDNs, the certificate is based on the object file's unique user filename and a secure key assigned to each client account. In other embodiments, the network storage system supports full HTTPS and SSL protocols for secure communications between clients/end-users and the network storage system.

Figure 5:
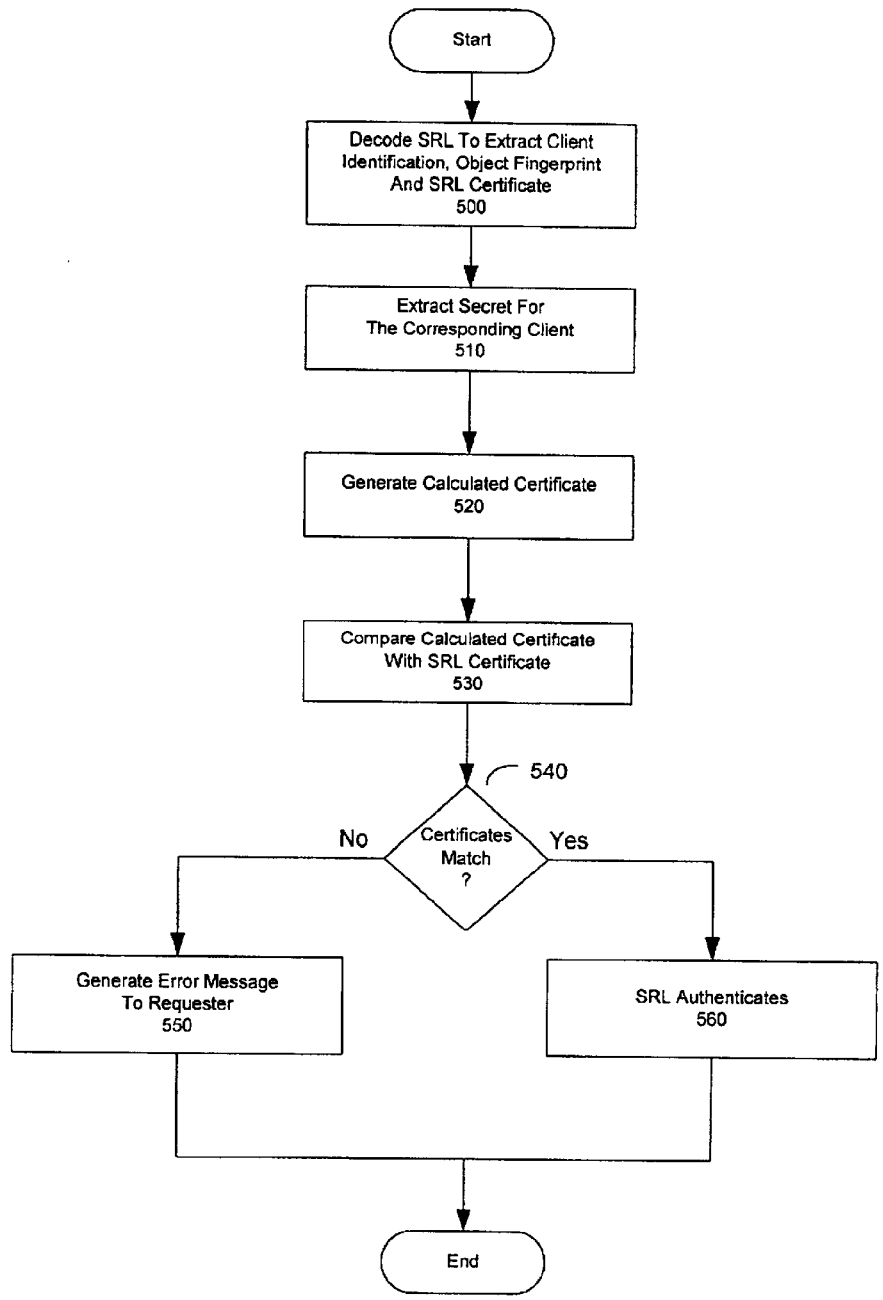
FIG. 5 is a flowchart illustrating one embodiment for authentication in the network storage system.

FIG. 5 is a flowchart illustrating one embodiment for authentication in the network storage system. To authenticate a request, the network storage system decodes the SRL to extract the client identification, the SRL certificate and the client filename or object fingerprint (block 500, FIG. 5). The network storage system (i.e., virtual file system or storage cluster) extracts a "secret" or secure key corresponding to the client identified with the request. In general, the "secret" or secure key is a password supplied by the client to authenticate operations in the network storage system. Using the secure key and object fingerprint, the network storage system generates a calculated certificate (block 520, FIG. 5). In one embodiment, the network storage system generates a calculated certificate for the request in accordance with the following expression:

MD5 Hash (Secure Key+MD5 Hash (Secure Key+Encoded SRL))

As shown above, a first MD5 hash calculation is performed on the object fingerprint and the secure key to obtain a first result, and a second MD5 hash calculation is performed on the first result and the secure key to obtain the calculated certificate. The network storage system compares the calculated certificate with the SRL certificate (i.e., the certificate transmitted with the SRL request) (block 530, FIG. 5). If the certificates match, then the SRL is authenticated, and the request is performed (blocks 540 and 560, FIG. 5). Alternatively, if the calculated certificate does not match the SRL certificate, then the network storage system generates an error message to the requester (blocks 540 and 550, FIG. 5).

Figure 6:
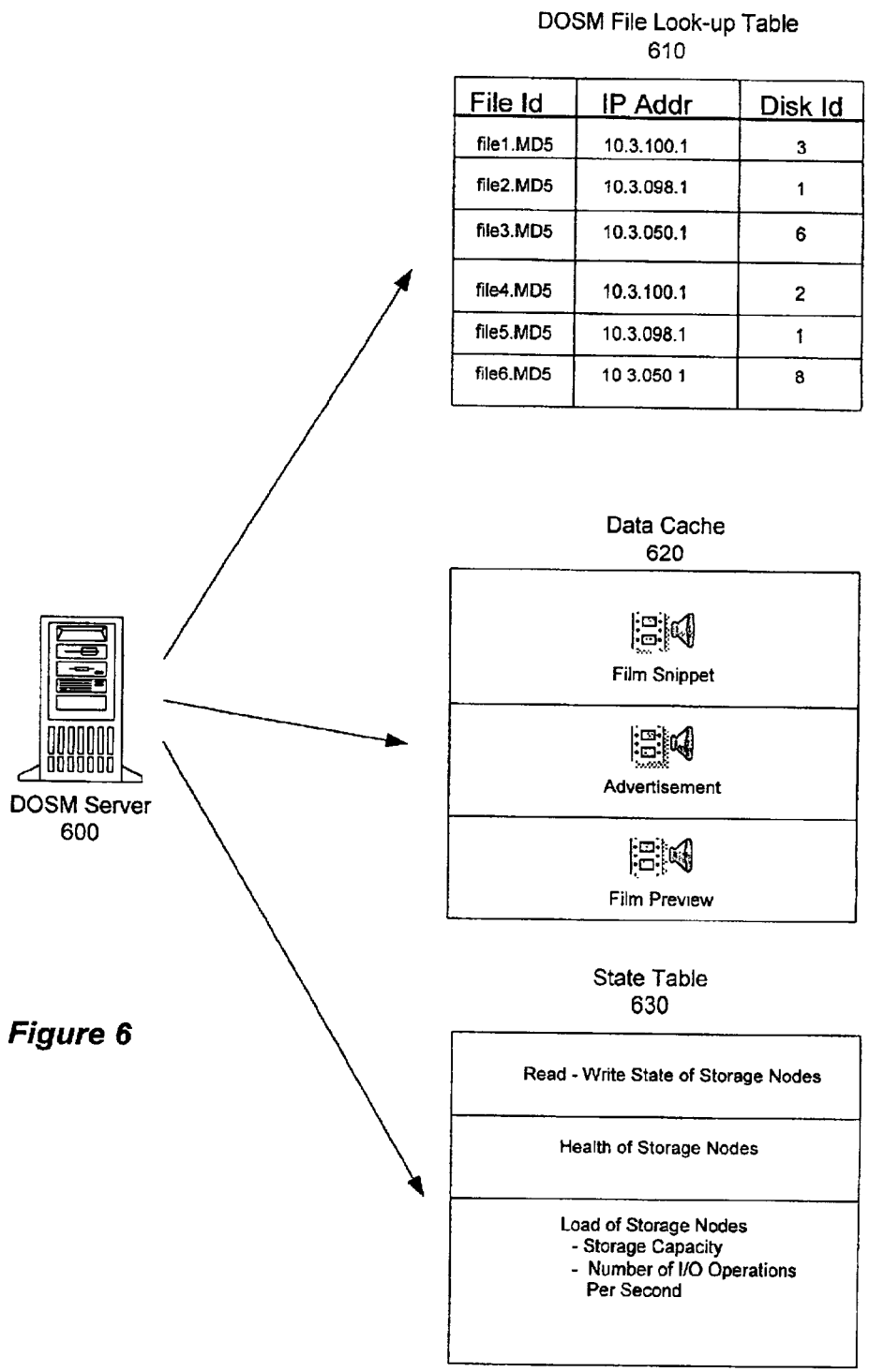
FIG. 6 illustrates one embodiment of a distributed object storage manager ("DOSM").

FIG. 6 illustrates one embodiment of a distributed object storage manager ("DOSM"). For this embodiment, the processes and functions of each DOSM (i.e., also referred to herein as a "control node") are implemented in software for execution on a computer, such as a server 600. In other embodiments, the distributed object storage managers 320 may be implemented in a combination of hardware and software on one or more computers. Each DOSM maintains a file lookup table to identify the location of object files stored in the intelligent storage nodes 340. Table 610 of FIG. 6 illustrates one embodiment for a DOSM file lookup table. For this embodiment, each entry of the table identifies a corresponding object file stored in an intelligent storage node. Specifically, each entry includes a file identification, an IP address, and a disk identification. The file identification, also referred to herein as the object fingerprint, is derived by performing an MD5 hash calculation on the contents of the object file. The result of this MD5 hash calculation is a 128 bit string. For this embodiment, the DOSM file lookup table stores, in the file identification column, the 128 bit string, with the file designation "MD5." The second column of the DOSM file lookup table stores the IP address of the intelligent storage node that stores the object file (e.g., "10.3.100.1"). The third column, labeled disk ID, stores an integer value that identifies the specific disk drive on the intelligent storage node that stores the object file. In one embodiment, when the look-up table is at full capacity, the DOSM uses a least recently used ("LRU") caching algorithm to replace existing entries in the DOSM lookup table with new entries received.

As shown in FIG. 6, the DOSM also includes a data cache 620. In general, the data cache 620 stores objects (i.e., client data) to permit the DOSM to streamline data directly to the recipient in response to a download request During a download request, in the event of a cache miss, when the object is transferred from the intelligent storage node to the recipient, the object is also stored in the data cache 620. Similar to the DOSM file lookup table, the data cache 620 uses a least recently used ("LRU") caching algorithm to replace existing entries with new data objects when the data cache is full.

The DOSM also maintains a state table 630. In general, the state table 630 provides the state of the system by storing information on the overall capacity and health of the intelligent storage nodes 340. In one embodiment, the state tables are built using the multicast protocol to obtain, from the intelligent storage nodes, information about the corresponding intelligent storage node. The state information indicates whether disks on the intelligent storage nodes are healthy, how much space is on the disks, etc. In one embodiment, as shown in FIG. 6, state table 630 stores: read-write state of the storage nodes; health of the storage nodes (including an identification of failed nodes); and the current load of the storage nodes, including available storage capacity and the number of input/output ("I/O") operations per second. The DOSM uses state information to select, in an upload operation, the appropriate intelligent storage node for storage of a new object file. For example, the DOSM uses information on the number of input/output ("I/O") operations per second to load balance the storage nodes. The DOSM also uses information on available storage capacity to select an intelligent storage node to store a new object file.

Figure 7:
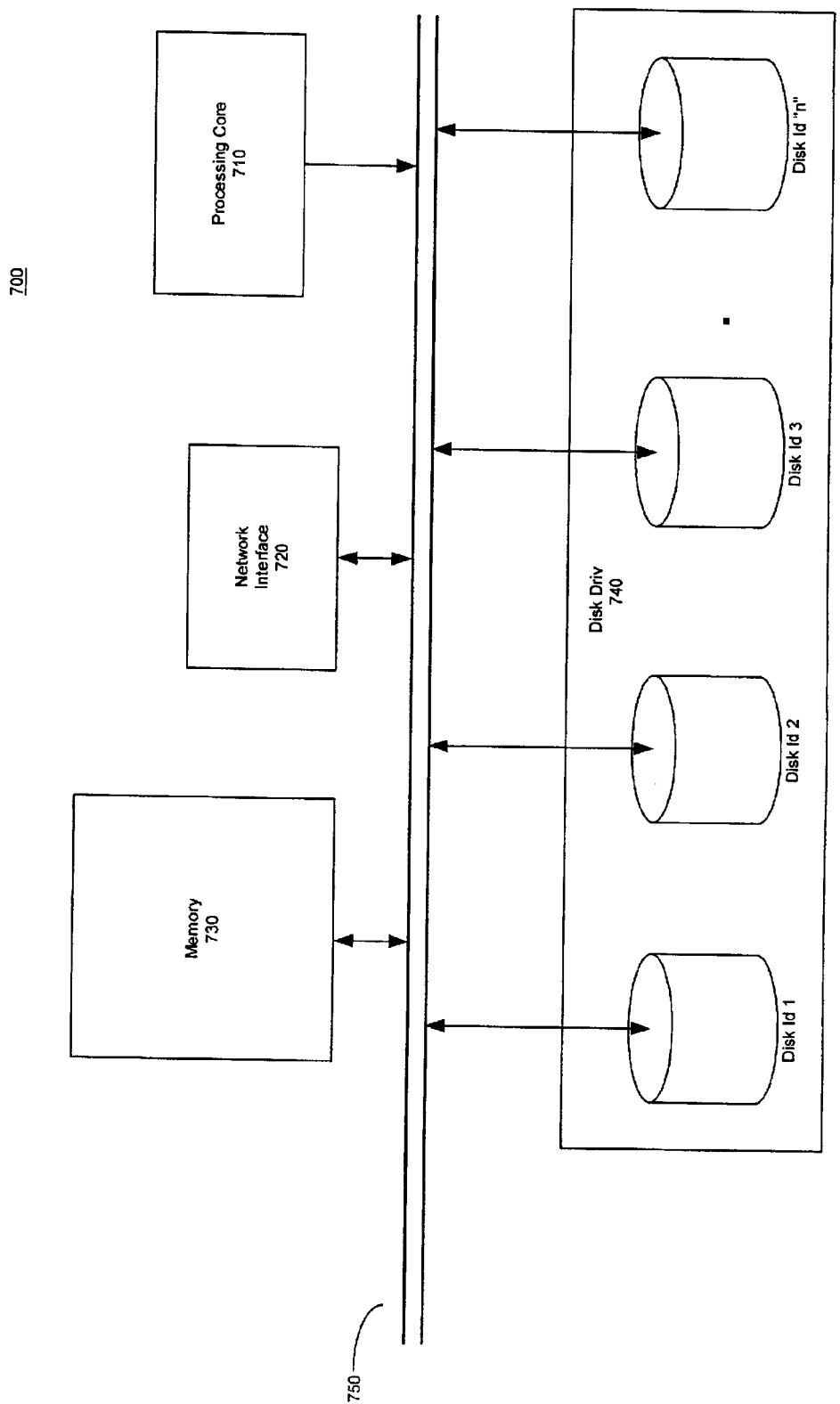
FIG. 7 is a block diagram illustrating one embodiment for an intelligent storage node.

FIG. 7 is a block diagram illustrating one embodiment for an intelligent storage node. For this embodiment, the intelligent storage node is implemented on a computer, including software to perform the functions described herein. An intelligent storage node 700 includes a processing core 710 that consists of one or more central processing units ("CPUs"). In one embodiment, the processing core 710 comprises two CPUs. The intelligent storage node 700 also includes volatile memory, labeled 730 in FIG. 7. The memory 730 is used to store instructions executed by the processing core 710, as well as data used by the intelligent storage node. The intelligent storage node 700 further includes a network interface 720 to interface the intelligent storage node to the plurality of distributed object storage managers 320 via the interconnect fabric 330. The elements of the intelligent storage node 700 communicate via a computer transport mechanism 750 (e.g., a peripheral component interconnect ("PCI") bus, processor bus, etc.). The computer transport mechanism 750 is intended to represent a broad category of one or more computer busses, such as peripheral component interconnect ("PCI") bus or the industry standard association ("ISA") bus.

The intelligent storage node 700 further includes a plurality of disk drives 740 to store the object files. As shown in FIG. 7, the number of disks in an intelligent storage node is represented as "n", such that "n" is an integer value greater than one. In one embodiment, the processing core 710 communicates with the disk drives 740 using the ISA protocol. However, any protocol used to access disk drives, including standard computer serial interface ("SCSI") protocol, may be used without deviating from the spirit or scope of the invention.

The intelligent storage node contains information to identify object files that it stores. In one embodiment, the information to identify object files is stored in the file system directory of the intelligent storage node. In other embodiments, the information to identify object files is cached. Table 5 illustrates example entries to cache the identification of object files in an intelligent storage node.

TABLE 5

| FILE ID | DISK ID |
|---------|---------|
| File1.MD5 | 1 |
| File6.MD5 | 2 |
| File4.MD5 | 2 |
| File5.MD5 | "n" |

Table 5 includes a file identifier and a disk identifier. The file identifier, or file ID, stores the unique file handle corresponding to the object file. In one embodiment, the unique file handle is the object fingerprint obtained from performing an MD5 hash function on the contents of the object file. For the first example entry in Table 5, the unique file handle is represented as "file1.MD5." The second column, labeled disk id, identifies the specific disk drive on the intelligent storage node that stores the object file. For the second example entry in Table 5, the object file, "file6.MD5", is stored on the second disk drive on that intelligent storage node. On initial start-up of the intelligent storage node, the intelligent storage node builds the file identification table.

Figure 8:
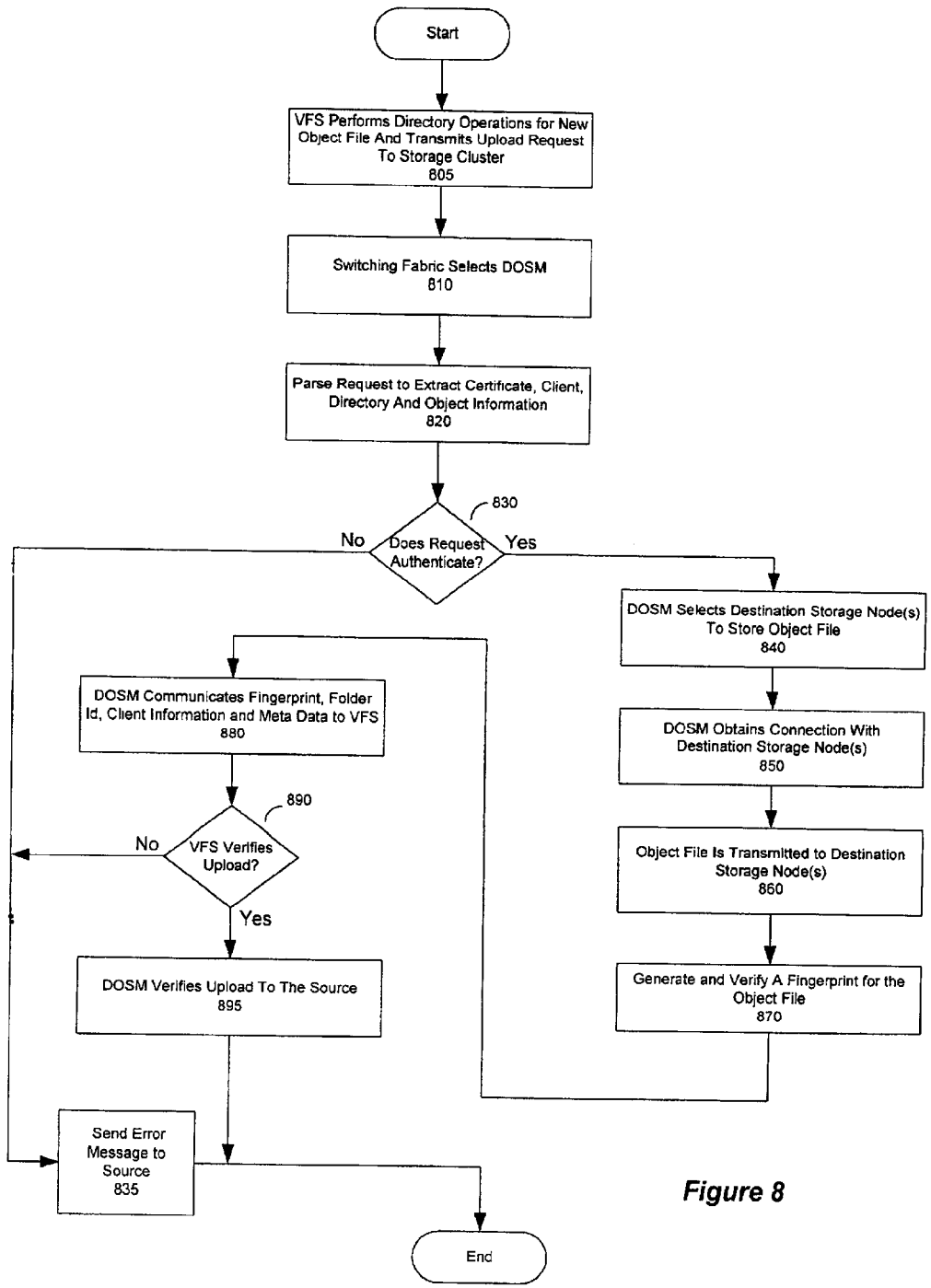
FIG. 8 is a flow diagram illustrating one embodiment for processing upload requests in the storage cluster.

The storage cluster also processes upload requests. FIG. 8 is a flow diagram illustrating one embodiment for processing upload requests in the storage cluster. For purposes of nomenclature, the "source", as used herein, refers to the source of the object file for the upload operation. If the storage cluster receives an upload request, then the load balancing fabric 320 (FIG. 3) selects an available DOSM to process the upload request (blocks 805 and 810, FIG. 8). The VFS creates a file identification (e.g., storage system node) and the appropriate directory for the new object file (block 805, FIG. 8). The selected DOSM parses the upload request to extract the certificate, object file, as well as client and directory information (block 820, FIG. 8). If the upload request does not authenticate, then the DOSM transmits an error message to the source (block 835, FIG. 8). Alternatively, if the upload request does authenticate, then the DOSM selects at least one intelligent storage node to store the object file (block 840, FIG. 8). In one embodiment, the upload operation stores the object file in two storage nodes. The "mirroring" of the object files ensures accessibility to the object in the event a failure occurs in an intelligent storage node. In one embodiment for "mirroring" the object files, the network storage system stores the object file at different geographic locations (e.g., different storage centers). If access to the geographically disparate storage center is unavailable at the time the object file is uploaded, then an additional copy of the file is stored at the local storage center.

In one embodiment, the DOSM uses a state table (FIG. 6) to select the intelligent storage nodes most appropriate to store the new object. For purposes of discussion, the selected intelligent storage nodes are referred to herein as the "destination intelligent storage nodes." The DOSM establishes a connection with the destination intelligent storage node (block 850, FIG. 8). In one embodiment, the DOSM establishes a DOSP point-to-point connection with the destination source node. The object file is then transferred to the destination intelligent storage node (block 860, FIG. 8). In addition, after transferring the file to the intelligent storage node, the DOSM receives a status message as part of the DOSP point-to-point protocol. The status message indicates whether the transfer operation was successful.

In one embodiment, the destination intelligent storage node generates a unique fingerprint for the object file (block 870, FIG. 8). Specifically, the destination intelligent storage node computes an MD5 hash of the contents of the object file. The intelligent storage node also verifies the object file. After receiving the successful status at the DOSM, the DOSM establishes a connection to the virtual file system ("VFS"). The DOSM communicates file information (e.g., the 128 bit.MD5 unique object fingerprint, file size, etc.), directory information (e.g., folder ID, parent folder ID, etc.), as well as client information and metadata (block 880, FIG. 8). The VFS attempts to verify the upload. If the VFS does not verify the upload, then an error message is sent to the source of the upload request (blocks 890 and 835, FIG. 8). If the VFS does verify the upload, then the verification is transmitted to the DOSM. In turn, the DOSM verifies the upload to the source (block 895, FIG. 8). Also, the storage system returns, to the source, a file handle that uniquely identifies the file to the network storage system.

If the source of the upload request is an end-user, then the DOSM re-directs the end-user to the client. For example, the DOM may redirect the end-user to a predetermined URL at the client's web site. In other embodiments, if the source was a storage port, then the DOSM transmits a storage system node (i.e. handle used only for the storage system) and the unique object file fingerprint.

Figure 9:
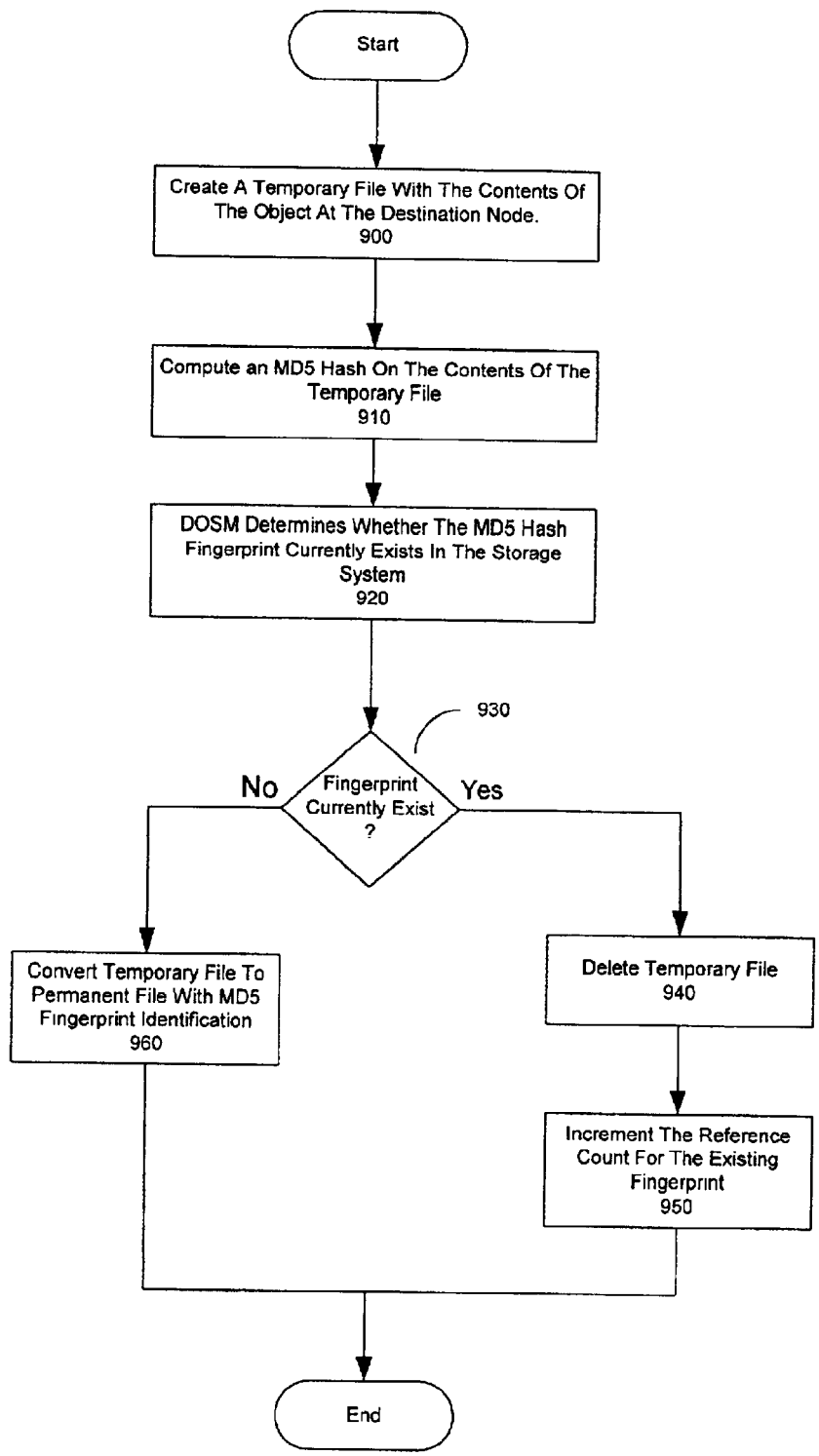
FIG. 9 is a flow diagram illustrating one embodiment for generating unique fingerprints of object files.

As discussed above, as part of the upload operation, the network storage system generates a unique fingerprint of the object file. FIG. 9 is a flow diagram illustrating one embodiment for generating unique fingerprints of object files. First, the destination intelligent storage node creates a temporary file with the contents of the object file (block 900, FIG. 9). An MD5 hash calculation is performed on the contents of the temporary file (block 910, FIG. 9). The DOSM determines whether the unique fingerprint, generated from the MD5 hash operation, currently exists in the network storage system (block 920, FIG. 9). If the fingerprint currently exists, the temporary file, which holds the contents of the object, is deleted (blocks 930 and 940, FIG. 9). Also, a reference count associated with the existing fingerprint file is incremented (block 950, FIG. 9). The use of reference counts is described more fully below in conjunction with a discussion of the delete operation. If the fingerprint generated from the temporary file does not exist, then the temporary file is converted to a permanent file, and the unique fingerprint is used to identify the file in the storage cluster (block 960, FIG. 9).

Virtual File System

Figure 11:
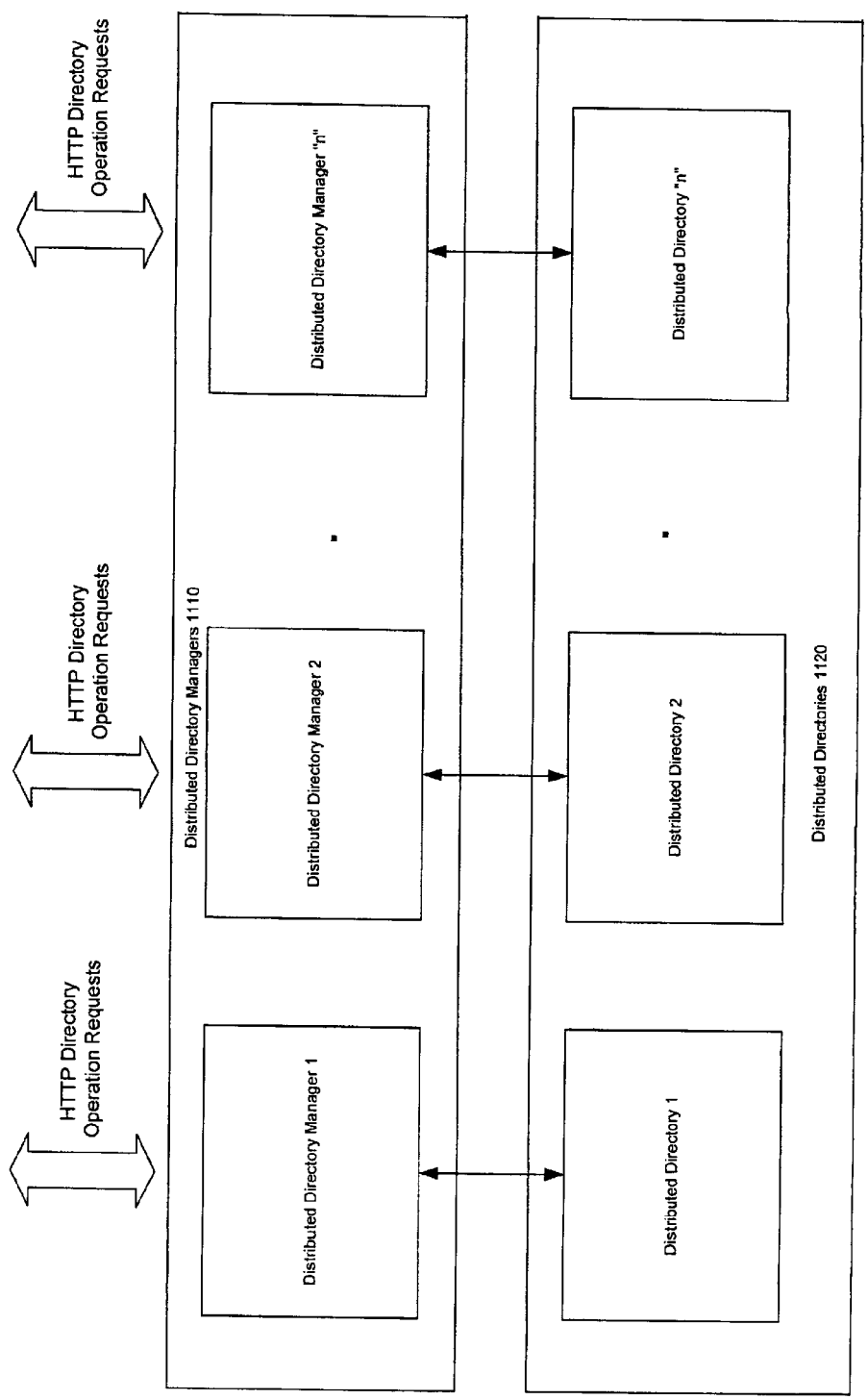
FIG. 11 is a block diagram illustrating one embodiment for implementing a VFS for use with a network storage system.

In one embodiment, directory operations are performed in the virtual file system ("VFS"). FIG. 11 is a block diagram illustrating one embodiment for implementing a VFS for use with a network storage system. In general, the VFS is the control path for maintaining the network storage system. The VFS maintains, for each object file, the customer file directory including the customer assigned filenames and the unique network storage system file identifiers. In one embodiment discussed above, the unique network storage system file identifiers consist of a 128 bit digital fingerprint obtained from performing an MD5 hash calculation on the contents of the object file. As shown in FIG. 11, the VFS consists of distributed directory managers ("DDMs") 1110 and distributed directories 1120. There are "n" DDMs and "n" distributed directories, wherein "n" represents any integer one or greater. In one embodiment, each client is mapped to a distributed directory.

The DDMs support common directory operations, such as "open file", "move file", "delete file", "open folder", "move folder", and "create folder." The arrows of FIG. 11 depict multi-directory requests and operations. The requests may originate from the end-user or the client, via a storage port or a web store. In one implementation, the requests to the VFS are transported using HTTP requests and encoded using the extended markup language ("XML"). Although the VFS is described using the HTTP protocol with XML encoded requests, any network protocol with any type of request format may be used without deviating from the spirit or scope of the invention.

In one embodiment, the VFS employs a database to implement the file system. For the database implementation, each directory operations request is converted into the database operation. Alternatively, the VFS may implement the file system using a local file system (ie., a file system local to the VFS). For the file system embodiment, files are generated to store information stored in the database implementation. Also, the DDMs include a lookup table to locate the files in the distributed directories. The files or database tables are replicated in a remote storage center.

The network storage file system consists of files arranged in directories or folders (hereafter referred to as folders). Similar to most file systems, the network storage file system is a hierarchical file system. In a hierarchical file system, directories or folders are arranged in levels, starting with a root or base folder. Additional folders or sub folders are then arranged under the root folder. The file system may comprise any number of levels, such that additional layers of sub folders fall beneath other sub folders. For purposes of nomenclature used herein, a parent folder to a folder is the folder arranged above the folder in the hierarchy of folders or directories.

FIG. 12 illustrates example database tables for implementing the file system with a database. For the database embodiment, the VFS maintains a customer table 1200, folder table 1210 and file table 1220. The customer table 1200 includes fields for "customer ID", "customer name", and "customer reserved fields." The customer ID is a network storage system identifier used to uniquely identify the client. The customer name is the real name associated with a customer. For the first example entry in the customer table

1200, "customer A" has a customer ID of "1." The customer reserved fields provide storage reserved for use by the client.

The folder table 1210 includes fields for "customer ID", "folder ID", "folder parent ID", and "metadata." For this embodiment, each entry in the folder table corresponds to a folder in the network storage file system. The customer ID, the same customer ID stored in the customer table, uniquely identifies the client. For the example entries in folder table 1210, the customer ID of "3" identifies that the folders have been assigned to "customer C." The folder ID identifies the specific folder for that entry. For example, the first entry in folder table 1210 is for a folder identified by the identification of "2." The third column, labeled "folder parent ID", identifies the parent folder for the folder corresponding to the database entry or row. For example, the second entry in folder table 1210 is a sub folder to the first entry of table 1210 (i.e., folder "100" is in the next hierarchical level beneath folder "2"). Note that the first entry in folder table 1210 does not have a value for the folder parent ID. This signifies that folder "2" is a root folder.

The file table contains an entry for each object file stored in a network storage file system. The example file table 1220 includes columns or fields for "customer ID", "file handle", "folder ID", "folder parent ID", and "metadata." Again, the customer ID identifies the customer that owns the file. The entries shown in file table 1220 are for files stored by customer C. The file handle field stores the fingerprint that the network file system uses to uniquely identify the file. Although the network file system stores 32 byte hexadecimal character sequences to identify files, for purposes of illustration, file handle entries for file table 1220 are shown as "52.MD5", "55.MD5", "99.MD5", and "67.MD5." The folder ID field identifies the folder that contains the file. For example, the first entry in file table 1220, corresponding to file "55.MD5", is organized or stored in folder 100. The folder parent ID identifies the parent folder to the folder that stores the file. The folder 100, which contains "52.MD5", has a parent folder of "2."

Figure 13A:
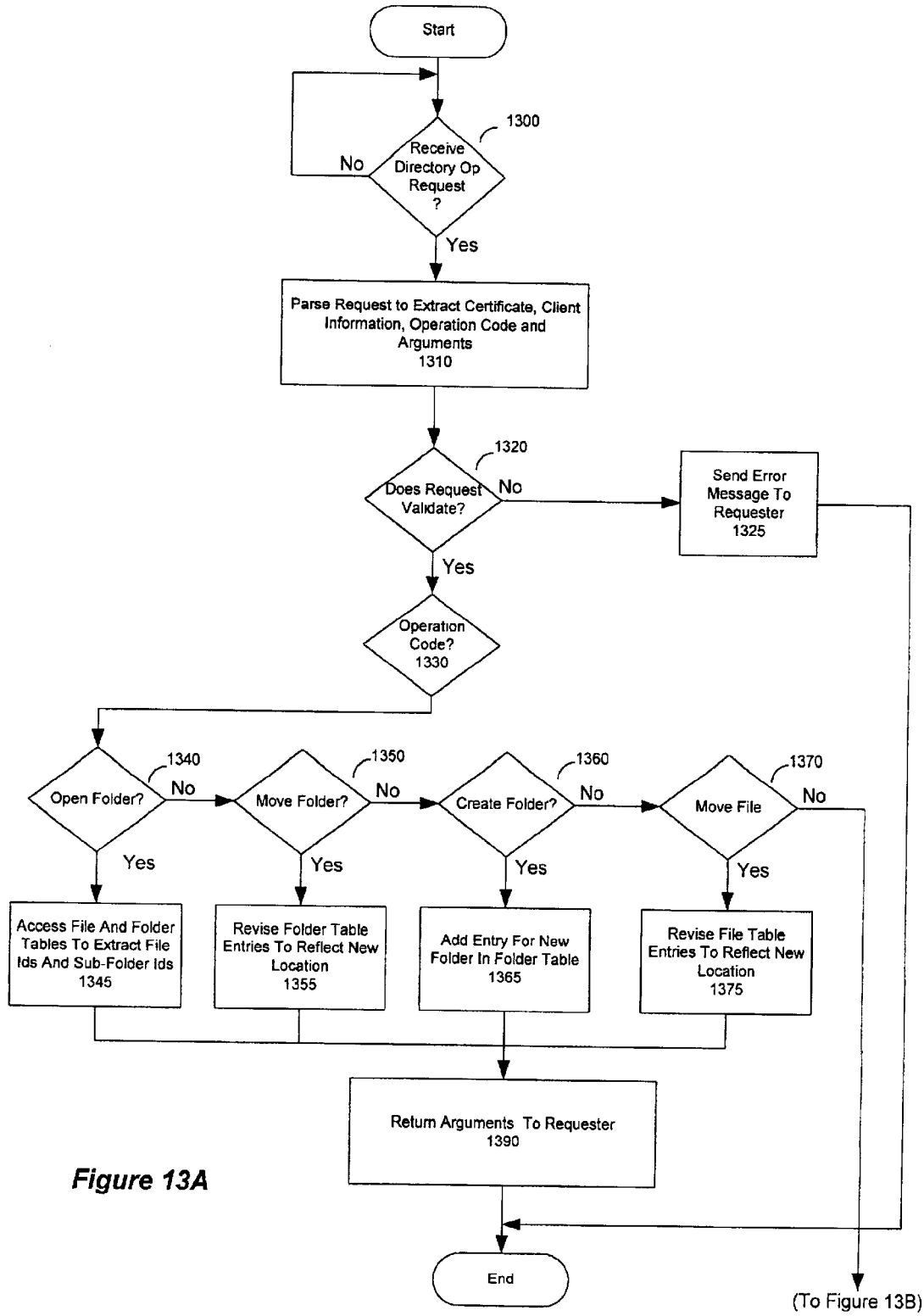
FIGS. 13A and 13B are flow diagrams illustrating one embodiment for performing directory operations in the VFS.
Figure 13B:
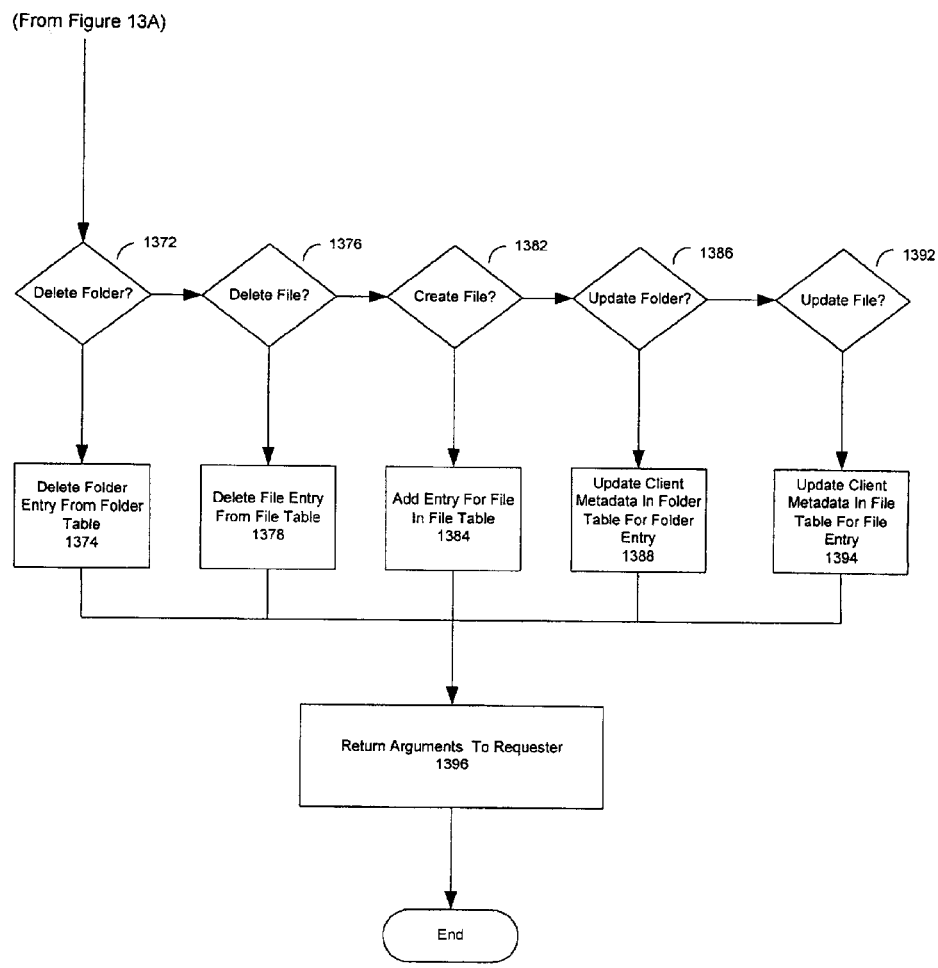

FIGS. 13A and 13B are flow diagrams illustrating one embodiment for performing directory operations in the VFS. When a DDM receives a directory operation request, the DDM parses the request to extract the certificate, an operational code, as well as arguments corresponding to the operational code (blocks 1300 and 1310, FIG. 13A). The operational code specifies the directory operation requested. The DDM, using the certificate and the information contained in the request, validates the request. If the request does not validate, the DDM sends an error message to the requester (blocks 1320 and 1330, FIG. 13A). Alternatively, if the request does validate, the DDM parses the operational code and extracts the arguments, including the folder to perform the open operation (blocks 1320 and 1330, FIG. 13A).

In general, if the operation is for an "open folder" operation, then the DDM returns all sub folders and files contained in the folder identified by the argument. Specifically, the DDM extracts, from the appropriate distributed directory, the file and folder tables that correspond to the folder identified as an argument in the "open folder" request (blocks 1340 and 1345, FIG. 13A). Specifically, the DDM extracts all the files and sub folders that correspond to the folder identified as an argument with the request. Using the example of FIG. 12, if the "open folder" request included the arguments "folder ID=2" and "customer ID=3", then the DDM extracts, from the folder table in the distributed directory, folder IDs 100 and 251 (ie., folders 100 and 251 are sub folders of the root folder 2). If the "open folder"

request included the arguments "folder ID=100", then the DDM extracts from the file table file handles "52.MD5" and "55.MD5."

If the operational code in a directory request is for an "open file" operation, subsequent to an "open folder" request, then file information is obtained from the file table (ie., file handle) and the client table (i.e., client identification) to construct an authentication certificate and an SRL for the file. For the above example, if the argument with the "open file" operation specified the file "52.MD5", then file and client information are obtained to construct the SRL for the "52.MD5" file.

If the operational code in a directory request is for a "move folder" operation, then a database operation is performed to revise the entries in the file and folder tables to reflect the new location of the folder. The "move folder" operation includes, as an argument, the new destination for the folder. Using the example of FIG. 12, if the "move folder" operation specified moving folder ID 166 from a sub folder of folder ID 251 to directly beneath the root folder 2, then the parent folder ID on the fourth entry of folder table 1210 is modified from "251" to "2." Also, for file table 1220, the parent folder ID for the third and fourth entries are modified from "251" to "2."

If the directory operation is a "create folder" operation, then a new entry or row is generated for the folder table (blocks 1360 and 1365, FIG. 13A). The "create folder" operation includes a parent folder as an argument. As described below, the client's folder name is converted to the network storage system's folder identification. Using the example of FIG. 12, if the requester desires to create a new folder under the sub folder 166, then the DDM assigns a new folder identification for the folder, and enters a new row or entry for the folder table 1210 with a folder parent ID of 166.

If the directory operation is a "move file" operation, then a database operation is performed to revise an entry in the file table to reflect the new location of the file (blocks 1370 and 1375, FIG. 13A). The "move file" operation includes a new destination for the file as an argument in the directory request. For the example database tables in FIG. 12, if the "move file" operation specified moving file "52.MD5" from folder 100 to folder 166, then the folder ID and folder parent ID fields for the first entry of file table 1220 are revised to "166" and "251", respectively.

As shown in block 1390 of FIG. 13A, the arguments extracted from the database tables are returned to the requester. In one embodiment, the response from a DDM includes XML encoded documents with the list of files (i.e., in the form of a SRL) and/or directories. For example, in response to the "open folder" request, the VFS returns file and folder Ids for the files and subfolders arranged under the subject folder.

FIG. 13B is a continuation of the flow diagram of FIG. 13A illustrating additional file system operations in the VFS. If the operational code is a "delete folder" operation, then the corresponding folder entry is deleted from the folder table (blocks 1372 and 1374, FIG. 13B). If the operational code designates a "delete file" operation, then the file entry, identified in the operation, is deleted from its file table (blocks 1376 and 1378, FIG. 13B). For a "create file" operation, the VFS adds an entry for a new file in the file table (blocks 1386 and 1388, FIG. 13B). If the operational code specifies an "update folder" operation, then the client metadata in the corresponding folder table for the folder entry is updated (blocks 1386 and 1388, FIG. 13B). For an "update file" operation, the VFS updates client metadata in the table for the corresponding file entry (blocks 1392 and 1394, FIG. 13B). After executing the appropriate database operation, the arguments for the operation are returned to the requester (blocks 1396, =FIG. 13B).

In one embodiment, the network storage system uses a reference count to manage up loading and deleting existing files. In general, when a new file is uploaded to the network storage system or a file request is received to upload an existing file, the reference count is incremented by one. Conversely, when a file request is received to delete a file, the reference count is decremented by one. The network storage system uses the reference count to delete an object file when the reference count is zero. For example, a client may transmit a first request to upload an object file, entitled "my file." After the upload operation is complete, the reference count to "my file" is one. Thereafter, a client may transmit a second request to upload "my file." Instead of storing a second copy of "my file", the network storage system increments the reference count of "my file" to "2." For this example, the client may then transmit a first request to delete "my file." In response to this request, the network storage system does not delete "my file." Instead, the network storage system decrements the reference count to "1." Thereafter, if the client transmits a second request to delete "my file", the reference count is decremented to "0", and the network storage system deletes "my file."

Figure 14:
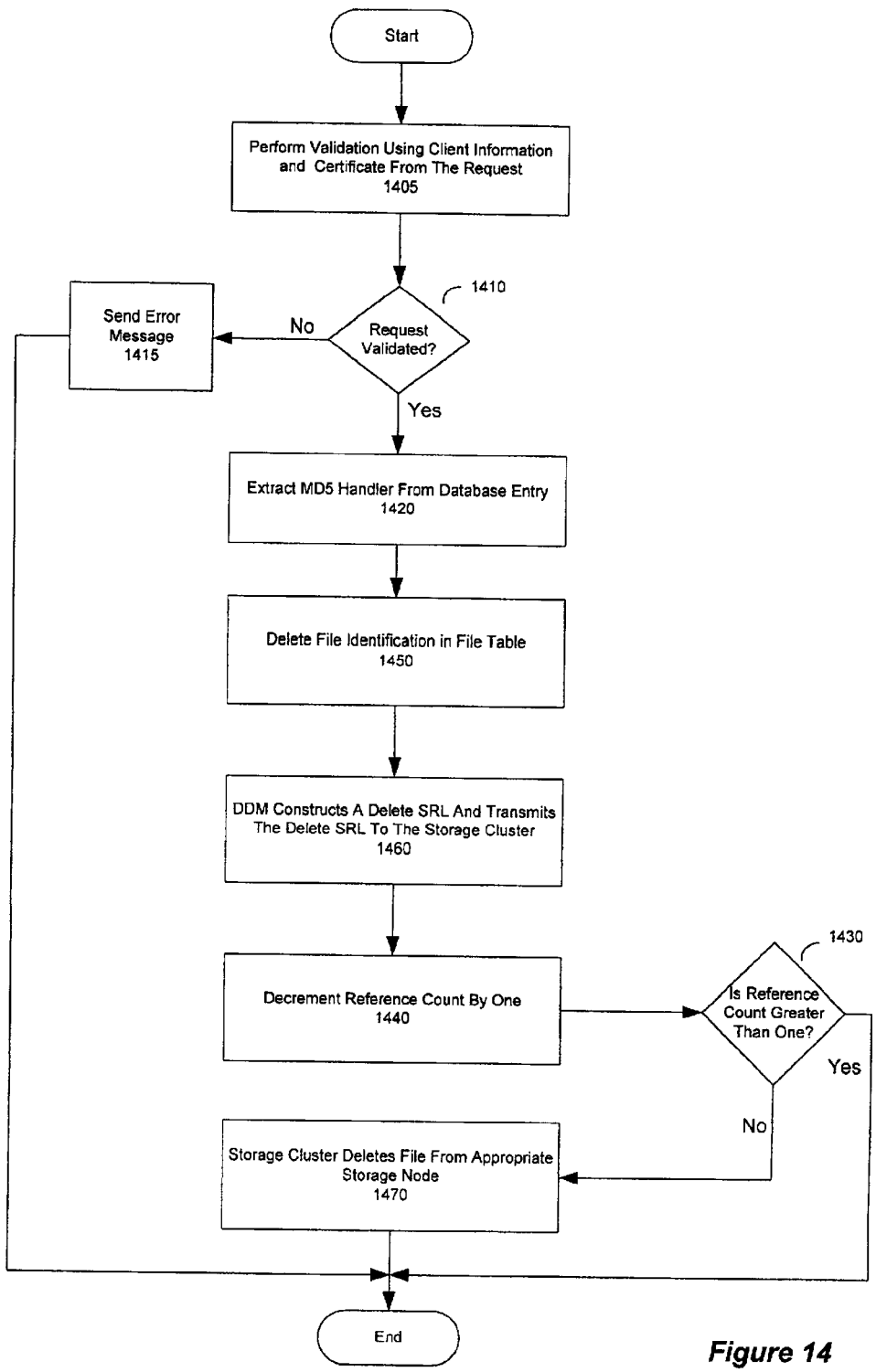
FIG. 14 is a flow diagram illustrating one embodiment for the delete file operation for the network storage system.

FIG. 14 is a flow diagram illustrating one embodiment for the delete file operation for the network storage system. If the VFS receives a delete request, then a DDM performs a validation check (blocks 1400 and 1405, FIG. 14). If the delete request is not valid, then an error message is transmitted to the requester (blocks 1410 and 1415, FIG. 14). If the request is validated, then the DDM extracts a file handle (i.e., MD5 file handle) from the file table in the database (block 1420, FIG. 14). The DDM deletes the file identification from the file table in the database (block 1450, FIG. 14). In addition, the DDM constructs a delete SRL, and transmits the delete SRL to the storage cluster (block 1460, FIG. 14). In response to the delete operation, the storage cluster extracts the reference count for the corresponding file. If the reference count is greater than 1, the storage cluster decrements the reference count by one (blocks 1430 and 1440, FIG. 14). Alternatively, if the reference count is one, the storage cluster decrements the reference count to zero, and deletes the file, identified by the SRL, in the appropriate intelligent storage node (block 1470, FIG. 14).

Dynamic Data Caching

Figure 10:
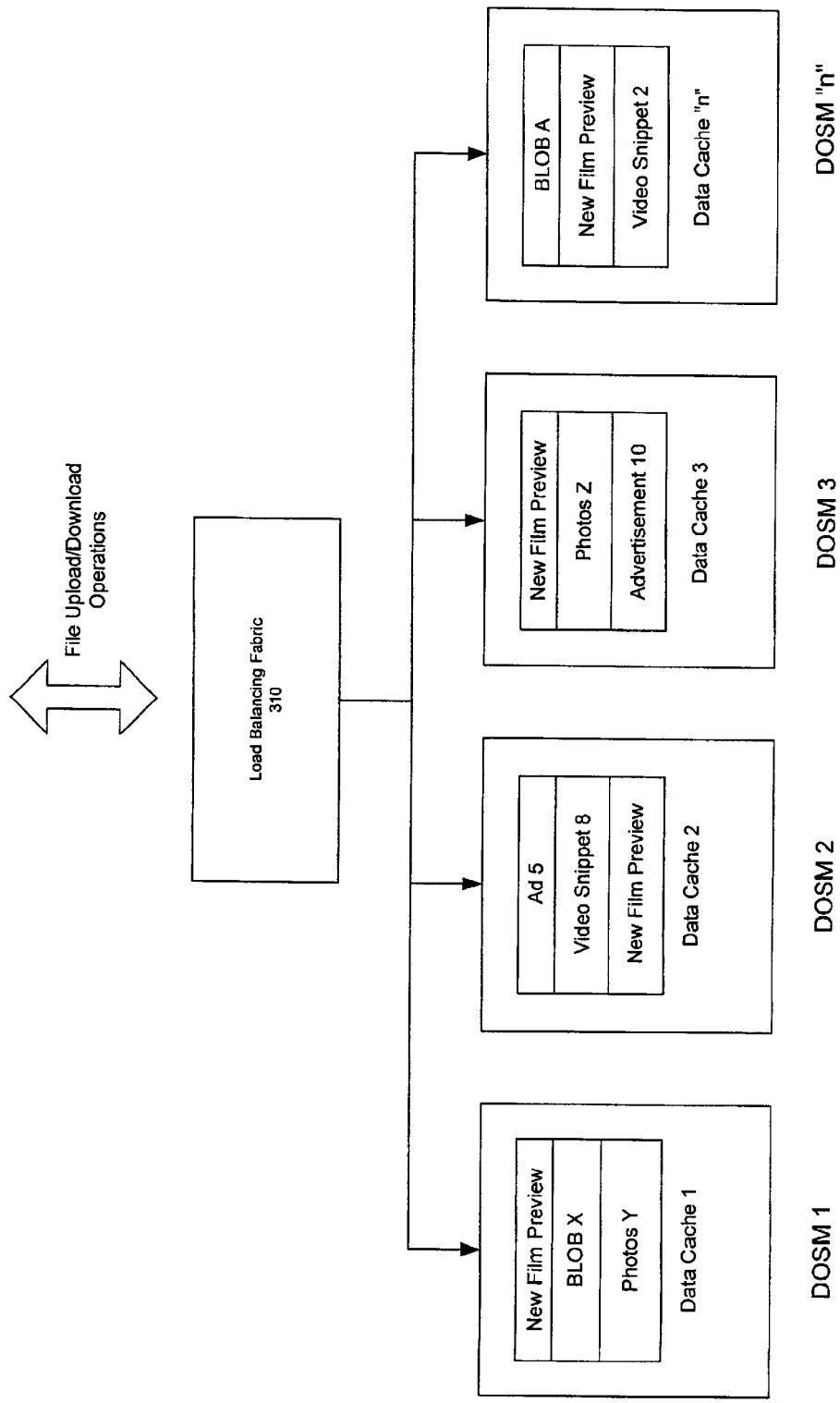
FIG. 10 is a block diagram illustrating one embodiment for caching data in the storage cluster.

FIG. 10 is a block diagram illustrating one embodiment for caching data in the storage cluster. As shown in FIG. 10, there are "n" DOSMs. Each DOSM (i.e., DOSM 1, DOSM 2, DOSM 3 . . . DOSM "n") contains a corresponding data cache (i.e., data cache 1, data cache 2, data cache 3 . . . data cache "n"). The network storage system file upload and download operations are received by the load balancing fabric 310 (also see FIG. 3). A switch, such as an L4 switch, with load balancing capabilities, allocates resources among a pool of resources. For the network storage system, the load balancing fabric 310 efficiently allocates requests among the "n" DOSMs. In one embodiment, when a DOSM transfers an object from the intelligent storage node to a destination, the object is cached in the data cache of the corresponding DOSM. Objects are deleted from the data cache in order to store objects more recently requested via a least recently used ("LRU") caching policy.

Load balancing the DOSMs in the network storage system permits an "automatic" caching of objects in high demand. In prior art systems, elaborate mechanisms are employed to identify data in high demand. Based on these decision mechanisms, data is cached in an attempt to meet the needs of the high demand. For example, an object may be in high demand when a movie studio offers, over its web site, a video preview of a newly released or upcoming film. For this example, the movie studio uses the network storage system to deliver the media rich object, "New Film Preview." The "New Film Preview" may be available to the end-user if the end-user "clicks" on a URL in the movie studio's web site. For this example, if the movie is very popular, when the movie studio client offers the "New Film Preview" through its web site, many end-users may attempt to download the rich object, "New Film Preview."

For an initial request to download the object "New Film Preview", the load balancing fabric 310 selects a DOSM to manage the request. For this example, the load balancing fabric 310 selects DOSM 1 to fulfill the request. Assuming the DOSM 1 does not currently store the object in its data cache, the DOSM 1 acquires the object from the appropriate intelligent storage node. As the object is delivered to satisfy the initial request, the object is stored in the DOSM 1 data cache 1. For this example, the storage cluster receives a second request for the "New Film Preview" object, and the load balancing fabric 310, based on availability, selects DOSM 3 to process the request. Again, assuming DOSM 3 does not currently store the object in its data cache, the DOSM 3 obtains the object from the appropriate intelligent storage node, and transfers the object to the requestor as well as stores the object in the data cache 3. Similarly, for this example, additional requests are made to the storage cluster to download the "New Film Preview" object. Based on available resources, the load balancing fabric 310 selects, for two separate requests, the DOSM 2 and the DOSM "n" to handle the two requests. Again, assuming DOSM 2 and DOSM "n" do not currently store the object in their data caches, both DOSMs acquire the "New Film Preview" object from the appropriate intelligent storage node, transfer the New Film Preview to the requester, and store the object and their respective data caches (i.e., data cache 2 and data cache "n"). As illustrated by the previous example, if an object is in high demand, the storage cluster, using a load balancing fabric that selects the different DOSMs, fetches, for storage in each of the DOSM data caches, a copy of the high demand object. Thus, the distribution of DOSM resources results in fast access to an object highly requested.

The dynamic caching of object files in the DOSM also occurs for object files retrieved from different storage centers. For example, an object file, "New Film Preview", may be stored in an intelligent storage node at storage center 1. In storage center 2, DOSMs receive requests for the object file, "New Film Preview." For this example, the DOSMs in storage center 2 retrieve the object file, "New Film Preview", from storage center 1. Similar to the example provided above, the DOSMs in storage center 2 cache the object file, "New Film Preview." Thus, object files in high demand are cached in DOSMs globally, as required by demand.

As shown in the example of FIG. 10, each data cache stores potentially different objects depending upon requests processed in the respective DOSMS. For example, in addition to the "New Film Preview" object, data cache 1 stores "Photos Y" and "BLOB X"; data cache 2 stores "Ad 5" and "Video Snippet 8"; data cache three stores "Photos Z" and "Advertisement 10"; and data cache "n" stores "BLOB A" and "Video Snippet 2."

Geographic Replication of Storage Centers

The network storage system is optimized to support a massive number of simultaneous download transactions.

The network storage system relies upon a single virtual directory of all file objects. From any location on the Internet, clients see the exact same view of their private file system. Thus, the network storage system supports simultaneous downloads of a single object that appears identical to users worldwide. In one implementation, the network storage system spans multiple continents with storage repositories or storage centers. The automatic geographic load balancing between storage centers ensures that all requests are directed to the nearest storage center. However, to provide fail over and enhanced performance, the storage center, including the storage cluster and VFS, are replicated. The physical replication across multiple locations includes a traffic management service. The traffic management service provides geographic load balancing of user transactions among geographic locations.

Figure 15:
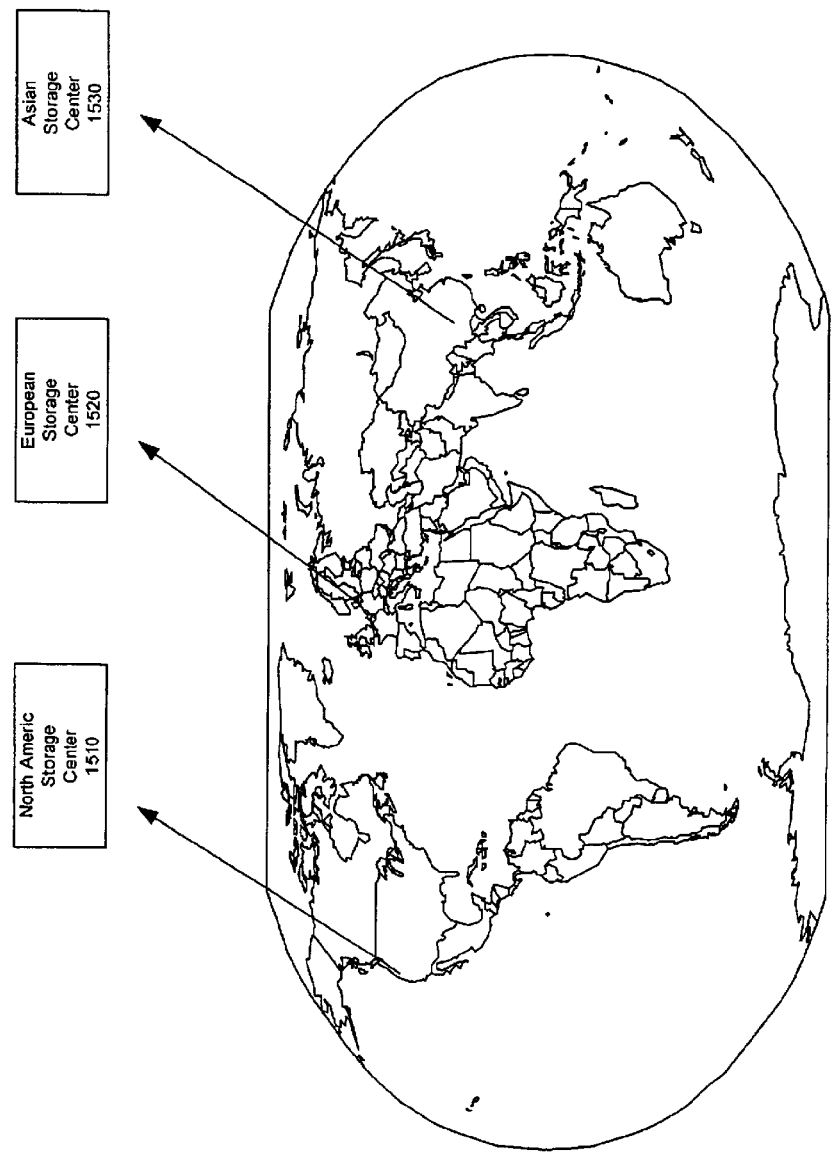
FIG. 15 illustrates geographical replications of storage centers.

FIG. 15 illustrates geographical replications of storage centers. For this example, there is a North American storage center 1510, an Asian storage center 1530, and a European storage center 1520. As shown in the example of FIG. 15, clients and end-users in North America have optimal access to the storage center through the North American storage center 1510. Also, clients and end users in Europe have optimal access to European storage center 1520. Similarly, clients and end-users in Asia have optimal access to be Asian storage center 1530. In this configuration, the storage center is coupled to a wide area network to provide the maximum bandwidth for the delivery of objects. If a particular storage center becomes overloaded with requests, new requests are automatically diverted to the next closest storage center. All objects are geographically mirrored to provide one hundred percent disaster protection. Also, if access to the geographically disparate storage center is unavailable at the time a file is stored, then an additional copy of the file is stored at the local storage center (i.e., the object file is mirrored locally).

The components within the network storage system are filly redundant with automatic recovery. Thus, the system supports extremely high level of service availability.

Download requests to each geographic storage center are continuously distributed across the DOSMs to deliver the fastest possible response time. In addition, in one embodiment, a global load balancing system ensures that the worldwide load across all storage centers is evenly spread to eliminate any "hot spots" and alleviate transitory demand spikes. The storage system operates far more quickly than the network itself, and thus introduces negligible delay to the overall file transit time. Thus, the worse case elapsed time for the individual object download is primarily determined by the speed of the wide area network used to transfer the object.

All components within the network storage system are replicated and redundant to provide complete recoverability in the event of a failure. In one embodiment, each storage center attaches to multiple network back bone providers to ensure continuous network access. All files and the control path directory structure are geographically replicated at the time of upload to prevent any possible loss of data. As is described more fully below, the system maintains coherency among disparate storage centers through use of the distributed object storage protocol ("DOSP").

Figure 16:
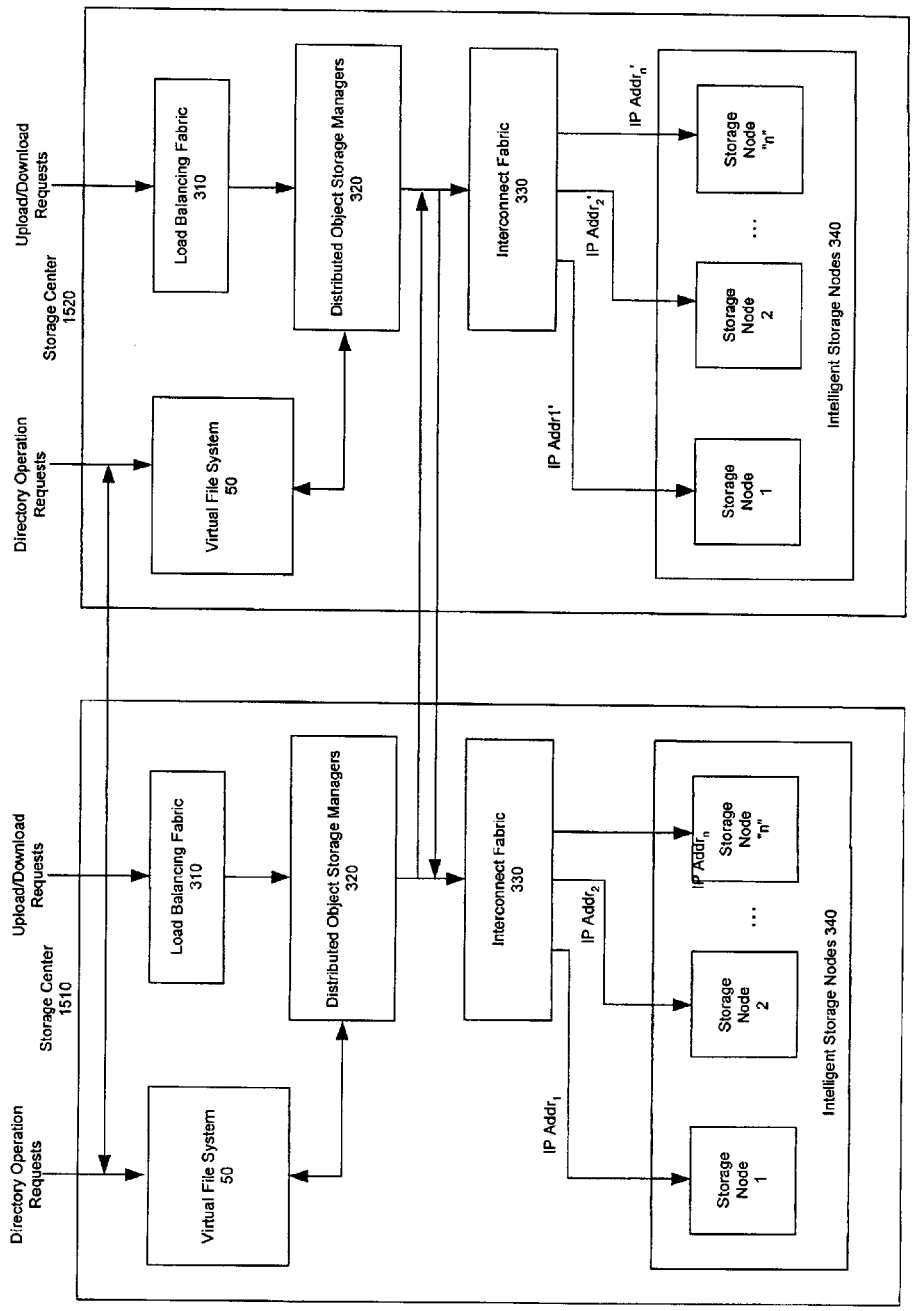
FIG. 16 is a block diagram illustrating one embodiment for replicating the storage centers.

FIG. 16 is a block diagram illustrating one embodiment for replicating the storage centers. For this example; two storage centers, labeled 1510 and 11520, are shown. However, based on the distributed architecture of the network storage system, any number of storage centers may be replicated. Storage centers 1510 and 1520 both include, for the storage cluster, load balancing fabric 320, distributed objects storage managers ("DOSMs") 320, interconnect fabric 330, and intelligent storage nodes 340. Storage center 1510 stores the same object files as storage center 1520. For example, if "object file 1" is stored in storage node 10 storage center 1510, then "object file 1" is stored in storage node "1" in storage center 1520. For the control path, the storage centers and 1510 and 1520 include the virtual file system ("VFS") 50. Similarly, the VFS in storage center 1510 stores the same directory information as the VFS in storage center 1520. Accordingly, the storage centers are replicated. Although the VFS and the storage clusters are shown in the same geographic "storage center", the VFS and storage cluster may be located at geographically disparate locations.

For this example, intelligent storage nodes in storage cluster 1510 (i.e., storage node 1, storage node 2, . . . storage node "n") are accessed via Internet protocol ("IP") addresses IP $addr_1$, IP $addr_2$, and IP $addr_n$, respectively. Thus, when a DOSM communicates with an intelligent storage node in storage center 1510, the DOSM uses these IP addresses to access the specific intelligent storage node. Storage center 1520 includes storage nodes (ie., storage node 1, storage node 2, . . . storage node "n") addressed by IP address IP $addr_1'$, IP $addr_2'$, and IP $addr_n'$, respectively. Thus, in storage center 1520, when a DOSM communicates with the storage node, the DOSM uses an IP addr across the interconnect fabric 330. Although the replication of storage centers is described using an TCP/IP network protocol, any network protocol and corresponding addressing scheme may be used to replicate the storage centers.

As shown in FIG. 16, the distributed objects storage managers of storage center 1510 are coupled to the interconnect fabric of storage center 1520. Similarly, the distributed object storage managers of storage center 1520 are coupled to the interconnect fabric of storage center 1510. Based on this configuration, the distributed objects storage managers of storage center 1510 have access to the intelligent storage nodes of storage center 1520. Likewise, the distributed object storage managers of storage center 1520 have access to the intelligent storage nodes of storage center 1510. As discussed above, each DOSM maintains a lookup table that correlates a file to an IP address (See FIG. 6). For example, if a file specified in a download request resides on storage node 1 in storage center 1510, then an entry of the DOSM lookup table specifies IP $addr_1$. Similarly, in storage center 1520, if a file resides in storage node 1, an entry for the DOSM lookup table specifies IP $addr_1'$.

The storage center architecture supports a "dynamic" fail over. If a storage node, or a disk drive on a storage node, renders the access to a file inaccessible, then the DOSM may obtain the file from the replicated storage center. In one embodiment, to perform "dynamic" fail over, a mapping is stored between intelligent storage nodes in storage center 1510 and intelligent storage nodes in storage center 1520. Table 6 below shows a mapping for the example in configuration of FIG. 16.

TABLE 6

| IP Address | IP Address' |
|---|---|
| IP $Addr_1$ | IP $Addr_1'$ |
| IP $Addr_2$ | IP $Addr_2'$ |
| . . . | . . . |
| IP $Addr_n$ | IP $Addr_n'$ |

For this example, IP $addr_1$ maps to IP $addr_1'$. If there is a failure in storage node 1 in storage center 1510, then DOSMs of storage center 1510 access storage node 1 of storage center 1520 using IP addr$_1'$. In one embodiment, the IP mapping between storage centers is implemented by modifying only the subnet address portion between the two IP addresses mapped. For example, if IP addr$_1$ is 10.3.100.1, then IP addr$_1'$ is derived by changing, as appropriate, the subnet portion of the address (e.g., 10.10.100.1).

The directory information stored in the VFS is replicated between storage center 1510 and 1520 in a similar manner. Thus, if a failure occurs in a distributed directory of storage center 1510, then the distributed directory manager in storage center 1510, using an IP address mapping, accesses the replicated distributed directory in storage center 1520.

In one embodiment, to further implement geographic replication for a fail over mode, if one disk fails, then a DOSM attempts to identify the file in the same node at a different storage center. If a storage node is rendered inoperable, then the DOSM clears the entry in the DOSM file lookup table, and attempts to locate the file at a remote storage center. For example, if disk "2" of storage node "1" in storage center 1510 fails, a DOSM 320 attempts to locate the file in storage node "1", disk "2", in storage center 1520. If the file is not located in storage node "1", disk 2, of storage center 1520, the DOSM, using the multicast protocol, attempts to locate the file locally (ie., in the storage center 1510). If the file is not located locally, the DOSM, using the multicast protocol, attempts to locate the file at a remote storage center (e.g., storage center 1520).

Accessing The Network Storage System

The network storage system has application for use in content delivery networks. In general, content owners and providers often employ the services of a content delivery network. Content delivery networks attempt to optimize the delivery of commonly accessed rich media objects. In order to maximize the delivery of the rich media objects, content delivery networks employ local caches at the edges of the wide area network.

The network storage system has applications to complement content delivery networks by providing the underlying content for the content origin web site. In one embodiment, each cache at the content delivery network directly accesses the geographically closest storage center to locate the desired object to eliminate the need for content delivery network to access the content owner's/provider's web site.

Figure 17:
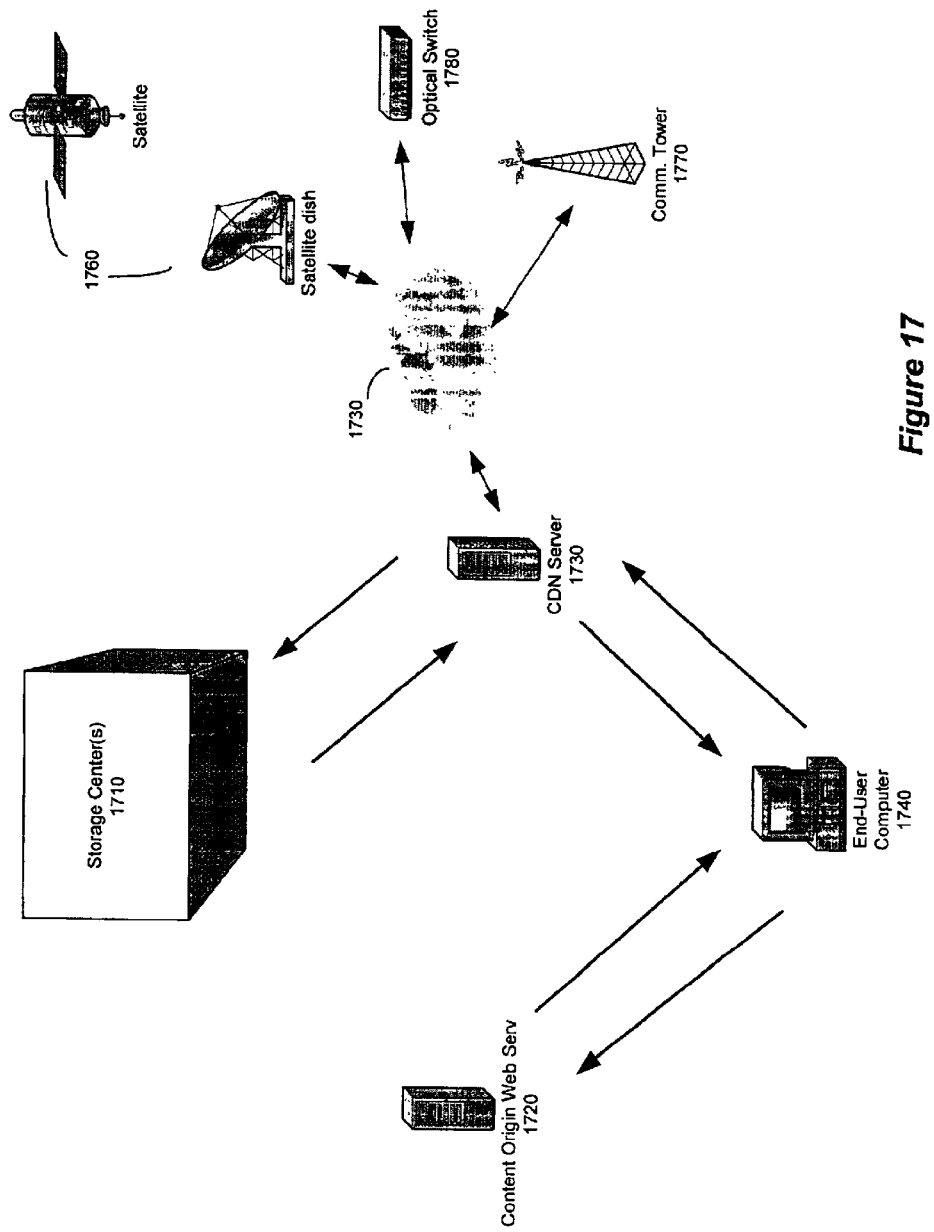
FIG. 17 illustrates one embodiment for use of the storage center in a content delivery network.

FIG. 17 illustrates one embodiment for use of the storage center in a content delivery network. For the example of FIG. 17, the content delivery network 1700 includes an end-user computer 1740 coupled over a network (e.g., Internet) to a content origin web server 1720. The content origin web server 1720 implements or hosts a web site. The web site permits the end-user to select content, such as rich media objects. A content delivery network includes a ("CDN") server 1730. The CDN server 1730 delivers content published on the web site by the content origin web server 1720. Specifically, the end-user computer 1740 is coupled to the CDN server 1730 to maximize the delivery of content, including rich media objects associated with the web site, to the end-user. The CDN server 1730 caches, at the CDN, a portion of the content associated with the web site 1730.

For purposes of illustration, a wide area network 1750 is shown as including satellite communication networks 1760, wireless communication networks 1770, and fiber-optic networks 1780. As illustrated in FIG. 17, the CDN server 1730 is located close to the edges of the wide area network 1750. The location of CDN server 1730 close to the wide area network 1750 optimizes the delivery of objects cached at the CDN server 1730. For this embodiment, one or more storage center(s) 1710 are coupled to the CDN server 1730. In the event of a cache miss at the CDN server 1730, the CDN server 1730 obtains the content (e.g., object file) from storage center(s) 1710. This configuration allows the CDN server 1730 to bypass the slower content origin web server 1720 in the event that content, requested by end-user computer 1740, is not located at the CDN server 1730. According, the storage center(s) 1710 optimize routing of content through the Internet back to the CDN when the desired content is not located in the local cache.

Figure 18:
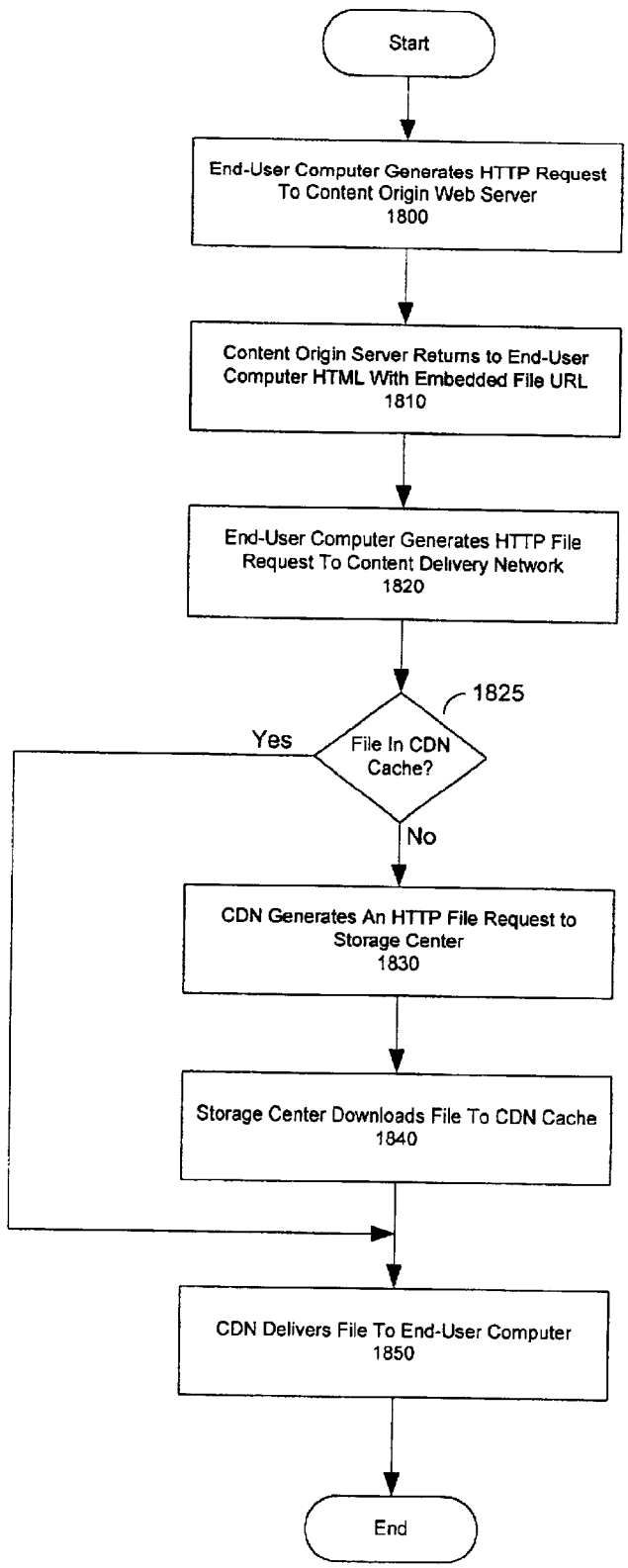
FIG. 18 is a flow diagram illustrating one embodiment for use of the storage center with a content delivery network.

FIG. 18 is a flow diagram illustrating one embodiment for use of the storage center with a content delivery network. The end-user, through the end-user computer, generates an HTTP request to the content origin web server (block 1800, FIG. 18). In response to the user request, the content origin server returns to the end-user computer HTML with embedded file URLs (block 1810, FIG. 18). The embedded file URLs identify the rich media objects stored at the CDN server. To obtain the rich media objects, the end-user computer generates HTTP file requests to the content delivery network (e.g., CDN server 1730) (block 1820, FIG. 18). If the file identified by the URL is located in a cache at the CDN server site, then the CDN server delivers the file to the end-user computer (blocks 1825 and 1850, FIG. 18). Alternatively, if the file is not cached at the CDN server site, the CDN server generates an HTTP file request to the storage center (blocks 1825 and 1830, FIG. 18). In one embodiment, the HTTP file request includes the network storage system's SRL, to uniquely identify the file. In response to the CDN server's request, the storage center downloads the file to the CDN cache (block 1840, FIG. 18). The CDN server delivers the file to the end-user computer (block 1850, FIG. 18).

Accessing The Network Storage System Using A Storage Port

There are multiple ways to access the network storage system. In one embodiment, the client uses a "storage port." The storage port provides access to the network storage system through a standard file system interface (e.g., network file system ("NFS") or Microsoft NT CIFS). The storage port may be configured by the client in various ways for different applications to optimize the delivery of rich media objects. In one embodiment, the storage port is configured at the client site to provide seamless integration from the client site to the network storage system. In another embodiment, to further off load rich media object traffic from a web site, the storage port may be used as a file system manager that downloads files to the end-user directly from the network storage system. In other embodiments, the network storage system may be directly interfaced with a private file structure.

The storage port device provides a transparent gateway connection into the network storage system. In one application, the storage port device is installed at the client site, and interfaces to local web servers via standard NFS or CIFS protocols over a local area network ("LAN") connection. Specifically, in one embodiment, the user mounts the storage port as a storage device on the client network. In this configuration, the storage port effectively provides the user with a virtual NFS or CIFS file system with storage capacity at the storage center (i.e., provides the user with hundreds of terabytes in storage capacity). In one embodiment, the storage port device occupies only approximately 1.75 inches of rack height. As described more fully below, multiple storage ports may be installed at a single client site to increase aggregate throughput.

Figure 19:
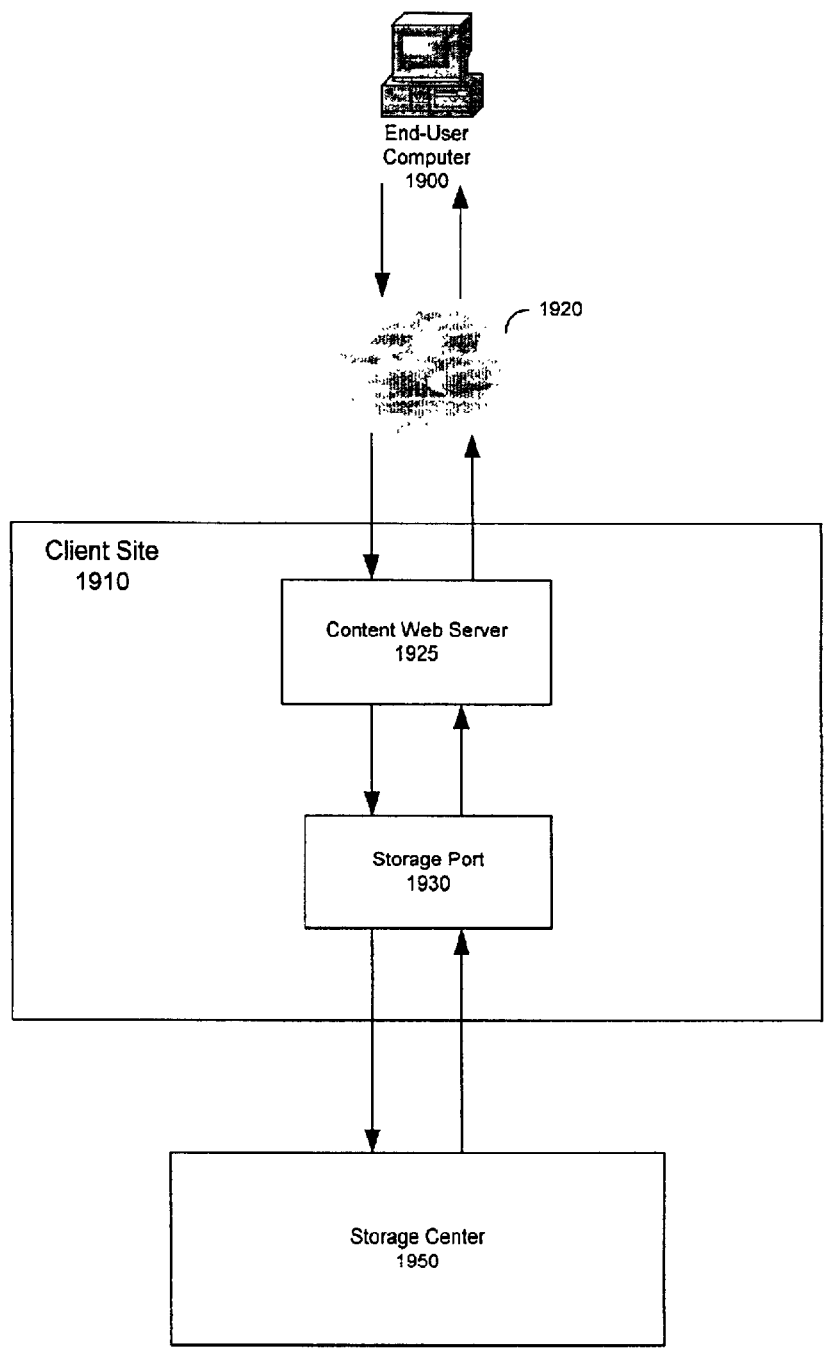
FIG. 19 illustrates one embodiment for use of the storage port in the network storage system.

FIG. 19 illustrates one embodiment for use of the storage port in the network storage system. An end-user 1900 communicates with a client site 1910 over a wide area network 1920. The end-user computer 1900 generates requests (e.g., HTTP requests) for files accessed through the client's web site. A content web server 1925, located at the client site 1910, processes requests to the client web site, including requests to download rich media objects. Content web server 1925 is intended to represent a broad category of computers and software used to implement a web site, such as multiple web servers and/or application servers, and any hardware/software configuration may be used without deviating from the spirit or scope the invention.

The content web server 1925 is coupled to the storage port 1930 over a network, such as a local area network at the client site 1910. Specifically, the content web server 1925 generates file and directory operation requests in accordance with the format of the "local" file system. As used herein, a "local" file system connotes one or more file systems or file structures used at the client site. For example, the content web server 1925 may generate NFS or Microsoft NT CIFS requests for files and directory operations. To interface the storage port 1930 with the content web server 1925, the storage port 1930 is mounted as a storage device. In one embodiment, one directory is mounted for object files and a second directory is mounted for SRLs. As shown in FIG. 19, the storage port 1930 communicates with the storage center 1950 to conduct file and directory operations.

Figure 20:
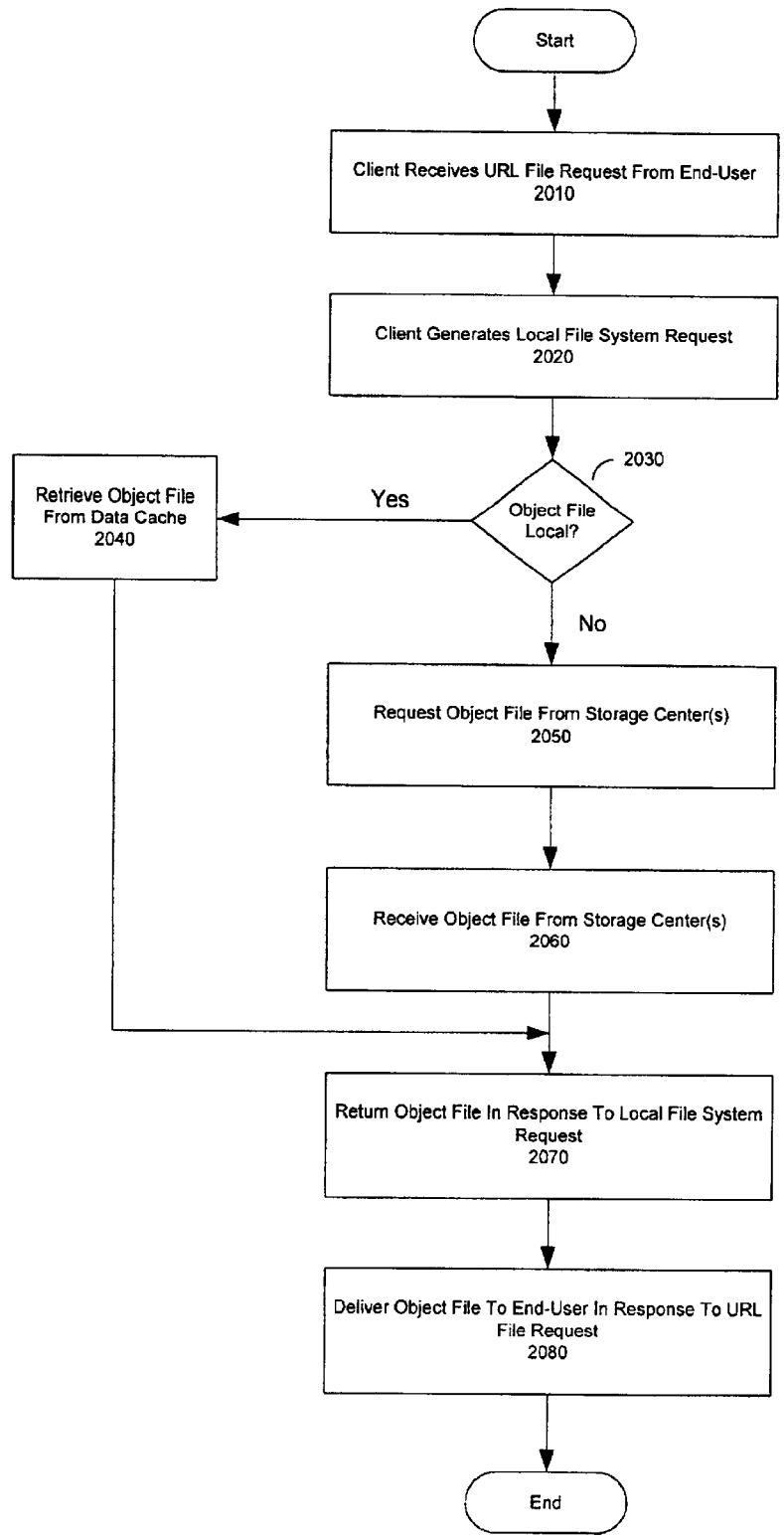
FIG. 20 is a flow diagram illustrating one embodiment for use of a storage port to deliver content.

FIG. 20 is a flow diagram illustrating one embodiment for use of a storage port to deliver content. The client site receives a URL file request from an end-user computer (block 2010, FIG. 20). The URL identifies an object file associated with the client's web site. In response to the end user's URL file request, the client site (e.g., content web server) generates a local file system request for the object file (block 2020, FIG. 20). The local file system request is received by the storage port. The storage port includes a cache to store both object files and directory information. If the object file is stored locally in the storage port, then the storage port retrieves the object file from the data cache, and returns the object file to the content web server in response to the local file system request (blocks 2030, 2040, and 2070, FIG. 20). Alternatively, if the storage port does not store a copy of the object file in its data cache, then the storage port requests the object file from the storage center (blocks 2030 and 2050, FIG. 20). In response to the local file system request, the storage center downloads the object file to the storage port, and the object file is returned to the content web server (blocks 2060 and 2070, FIG. 20). Thereafter, the content web server delivers the object file to the end-user in response to the URL file request (block 2080, FIG. 20).

Figure 21A:
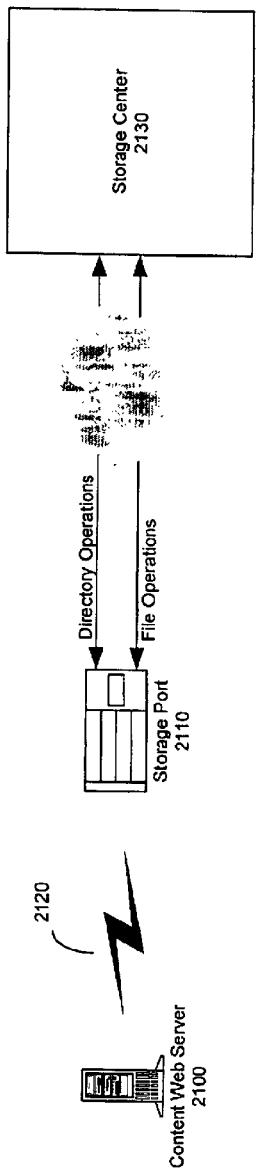
FIG. 21a illustrates one hardware configuration for a storage port device.

The storage port may be implemented in either hardware or software. FIG. 21*a* illustrates one hardware configuration for a storage port device. As shown in FIG. 21*a*, the content web server 2100 communicates with the storage port 2110 over a communications link 2120, such as a local area network. The storage port 2110 conducts file and directory operations with storage center 2130.

Figure 21B:
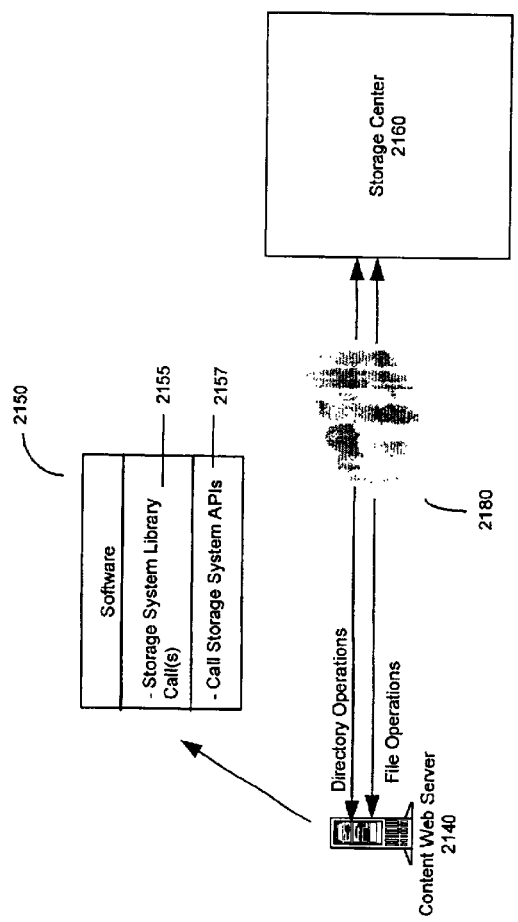
FIG. 21b illustrates embodiments for implementing the storage port in software.

FIG. 21*b* illustrates embodiments for implementing the storage port in software. In one embodiment, the network storage system is accessed through library calls or through application program interface ("API") calls. For these embodiments, the software provides translation between the client's local file system and the network storage file system. As discussed above, the storage center 2160 includes software running on computers for performing the functions of the VFS and intelligent storage clusters. This software includes entry points (i.e., APIs) to permit interfacing of external software. In part, the APIs on the storage center software permit the client to conduct file and directory operations as described herein. As shown in FIG. 21*b*, content web server 2140 runs, in addition to software to operate the client site, software to call APIs in the network storage center. Thus, for this embodiment, the content web server 2140 executes network storage system file and directory operations over the wide area network 2180 through remote program calls.

In another embodiment, shown as storage system library calls 2155, a customized network storage system library includes a collection of file system operations. For example, one library function may permit software operating at the client (e.g., on content web server 2140) to request an object file download to the storage center through use of the library function. For this example, to perform the file download operation, the client software calls the file download function and passes the SRL as an argument to the function call. A library of functions provides an additional means to interface client software to directly access the network storage system.

Figure 22:
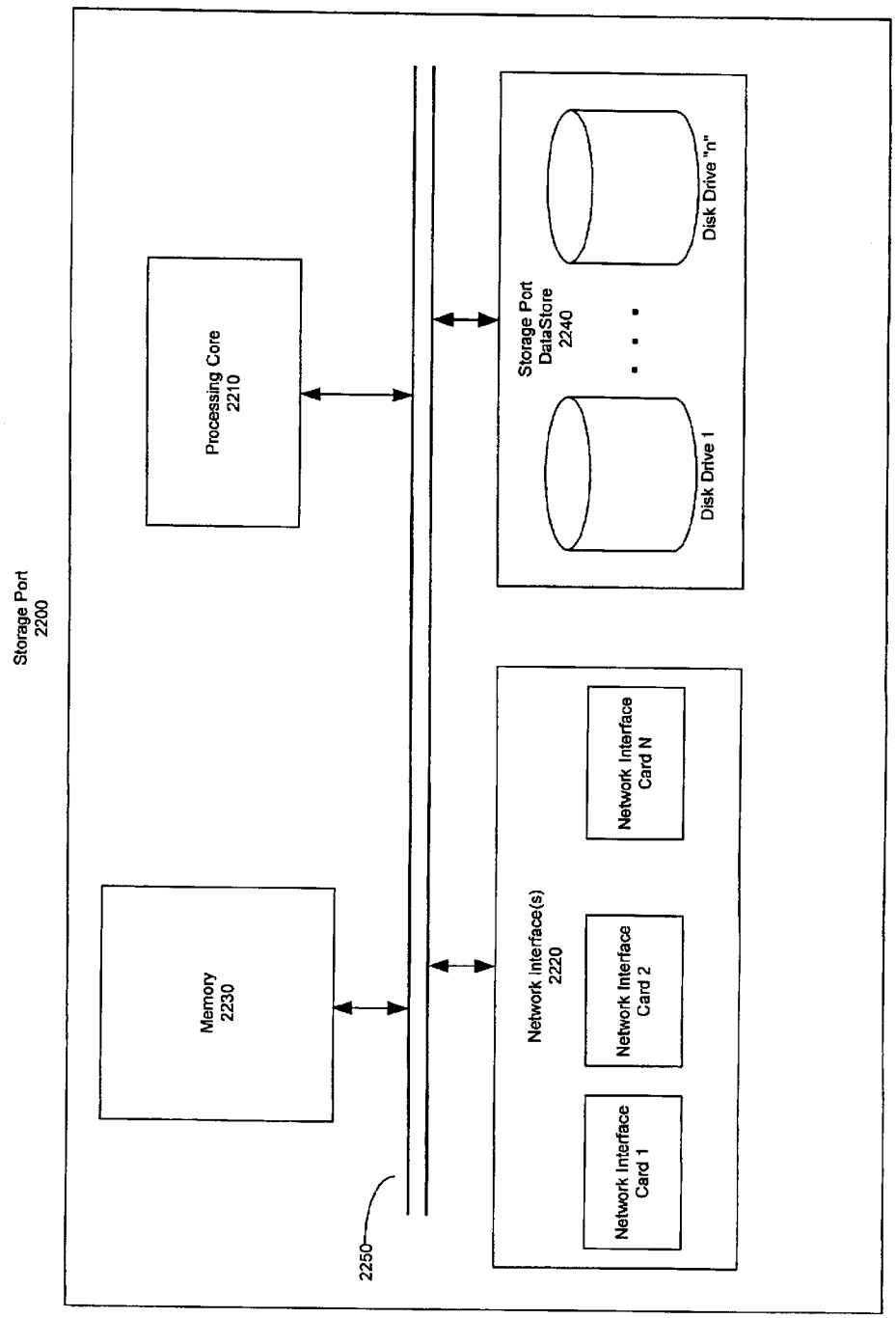
FIG. 22 is a block diagram illustrating one embodiment for a storage port.

FIG. 22 is a block diagram illustrating one embodiment for a storage port. As shown in FIG. 22, a storage port 2200 includes a processing core 2210, memory 2230, storage port data store 2240, and network interface(s) 2220. These components are coupled via a bus transport 2250 that may include one or more busses (e.g., ISA, PCI, or microprocessor buses). Processing core 2210 includes one or more central processing units ("CPUs"). In one embodiment, the storage port includes two CPUs. Memory 2330 is used to store, during operation of the device, software to perform the functions of the storage port described herein. The storage port data store 2240 contains one or more hard disk drives (i.e., "n" hard disk drives, wherein "n" is any number one or greater), used, in part, to cache file system information (i.e., directory cache) and object files (i.e., data cache). The network interface(s) 2220, which includes "n" network interface cards, couples the storage port 2200 to client devices (e.g., content web server). In addition, to support a fail over architecture, the network interface cards are used to connect one or more storage ports together. In one embodiment, the storage port includes three network interface cards.

Figure 23:
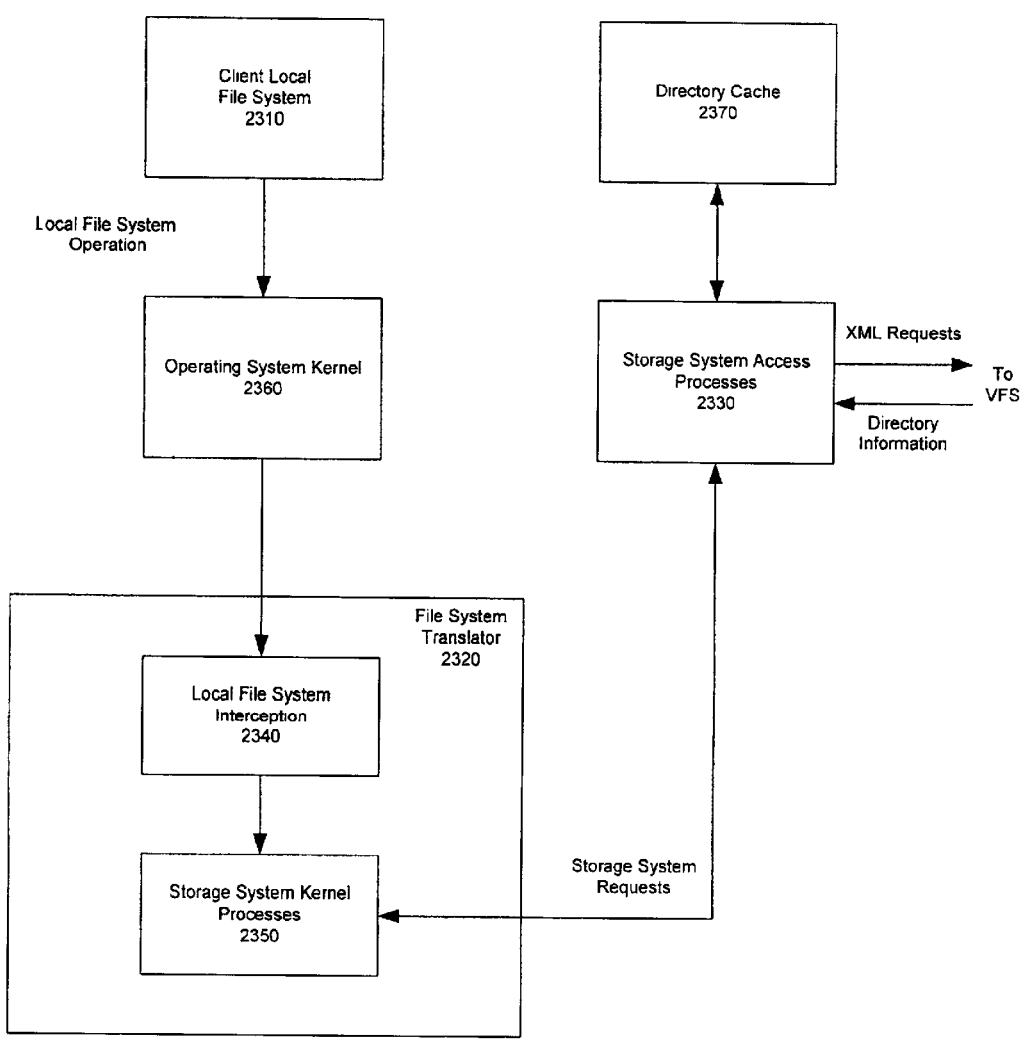
FIG. 23 is a block diagram illustrating one embodiment for file system translation in the storage port.

FIG. 23 is a block diagram illustrating one embodiment for file system translation in the storage port. The network storage system issues "file handles" unique to the network storage system. In one embodiment, a network storage system file handle identifies, for a corresponding file: a) client identification; b) parent directory; c) metadata and d) the unique digital fingerprint (ie., 128 bit MD5 identification). In general, the file system translation software 2300 converts local file system operations to network storage system file system operations. In one embodiment, to perform this function, the software includes file system translator 2320 and storage system access processes 2330. The file system translator 2320 includes local file system interception 2340 and storage system kernel processes 2350.

In operation, local client file system 2310, which may include operating system software running at the client's site, issues local file system operations. For example, the client software may issue requests, in accordance with UNIX or Microsoft NT to open a file. The file open operation includes a file descriptor that identifies the file in the local file system. Typically, file system calls are processed by the operating system kernel (labeled 2360 in FIG. 23). The operating system kernel software maintains a mapping between file descriptors and directories to "inodes." The inodes provide the system a physical pointer to the file data in the system (e.g., a pointer to the file stored on a hard disk drive).

For the embodiment of FIG. 23, when the local client file system 2310 issues a file system operation, local file system interception 2340 "traps" or intercepts the call, and passes the thread of execution to the storage system kernel processes 2350. In one embodiment, the local file system interception 2340 comprises CODA software, developed at Carnegie Mellon University. In general, CODA is a type of distributed file system. A portion of the functionality provided by the CODA software exports an underlying file system. Specifically, CODA exports file system operations, typically executed in the kernel level, to applications programs accessible in the user portion of memory. Although file system translation is described using CODA to intercept local file system operations, any software that intercepts file system calls may be used without deviating to the spirit or scope of the invention.

In general, the storage system kernel processes 2350 obtains network storage system file handles (referred to herein as "storage handles") for storage in operating system kernel 2360 to provide a mapping between local file system descriptors and storage handles. Thus, the file descriptors provide a handle to identify files and directories in the local file system, and the storage handles provide a handle to identify files and directories in the network storage system.

To maintain the mapping between local file system descriptors and storage handles, the storage system kernel processes 2350 obtains network storage file system information from storage system access processes 2330. Specifically, storage system kernel processes 2350 obtains from storage system access processes 2330 storage handles and directory information. As shown in FIG. 23, storage system access processes 2330 obtain directory and storage handle information from directory cache 2370. Alternatively, if directory and storage handle information is not cached at the storage port, storage system access processes 2330 query the network storage system (i.e., VFS) to obtain directory information and storage handles. Accordingly, the translation system 2300 provides a mapping between the client's local file system and the network storage file system.

Figure 24:
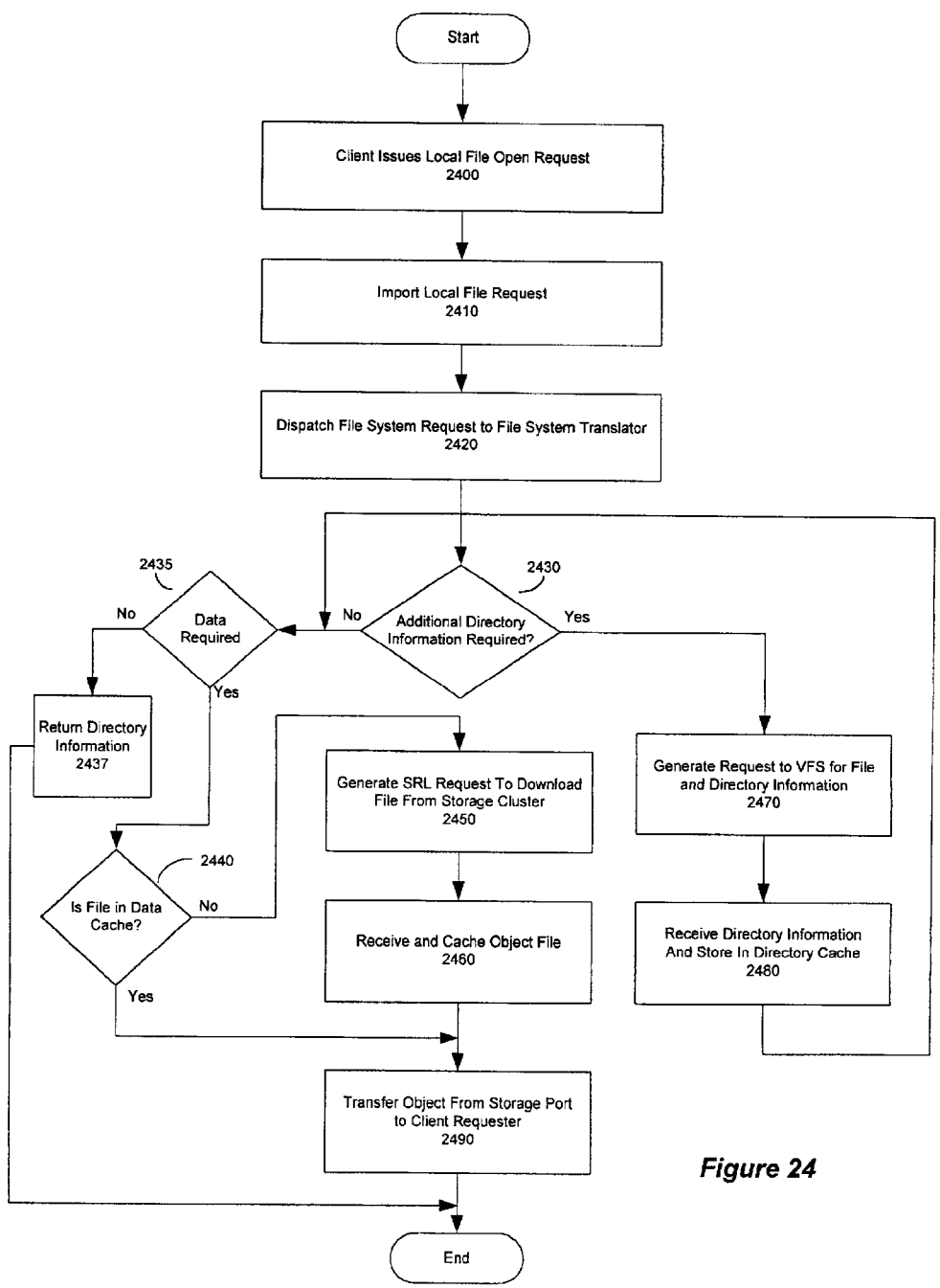
FIG. 24 is a flow diagram illustrating one embodiment for translating a file system operation from a local file system to the network storage file system.

FIG. 24 is a flow diagram illustrating one embodiment for translating a file system operation from a local file system to the network storage file system. The process is initiated by the client issuing a local file system request (block 2400, FIG. 24). The local file system request is received by the operating system kernel, and dispatched to the file system translator (FIG. 23). For example, if the file system operation is an open file operation for the file "foo.txt", then the operating system kernel dispatches the open file operation with the file name "foo.txt" as an argument to the file system translator. If the file system operation is an "Open Folder" operation for the folder "dir1", then the operating system kernel dispatches the open folder operation with the folder name "dir1" as an argument.

The process determines whether there is sufficient directory information in the storage port directory cache (block 2430, FIG. 24). For the "Open Folder" example above, if the storage handles for all subfolders and files are not stored in the directory cache, then additional directory information is required to fulfill the request. For the "Open File" example, if the storage port has been recently initialized and thus does not contain information on the file, then additional directory information on the file (e.g., "foo.text") is required to open the file.

If there is sufficient directory information in the directory cache, and the file system operation does not require retrieving data (i.e., the file system operation is not an "open file" operation) or updating directory information, then the appropriate directory information from the directory cache is retrieved and returned in response to the local file system operation (blocks 2430 and 2435, FIG. 12) (blocks 2435 and 2437, FIG. 24). For the "Open Folder" example above, storage handles for all subfolders and files in the subject folder are retrieved from the directory cache, the storage handles and corresponding file identifiers are stored in the operating system kernel, and the file identifiers are returned to local file system.

If additional directory information is required (ie., the information is not in the storage port directory cache), then a request is generated to the VFS for the additional directory information (block 2070, FIG. 24). In one embodiment, the storage port generates an XML encoded request. For the "Open Folder" example, if the storage nodes and corresponding file identifiers are not stored in the directory cache, then the storage port generates an XML encoded "Open Folder" request to extract file and folder information for files and subfolders within the subject folders (i.e., the folder that is the subject of the "Open Folder" request). In one embodiment, in response to a request for folder information, the VFS returns name, folder identification, client metadata, upload SRL, and parent folder identification. In response to a request for file information, the VFS returns name, file identification, client metadata, download SRL, and parent folder identification. In one embodiment, the client metadata fields are used to track and maintain state information used in the local file system (e.g., information for UNIX, Microsoft Windows or NT, etc.). In addition to obtaining additional directory information, if the client local file system command is a directory operation (i.e., "move folder", "delete folder", etc.), then an XML request to the VFS is generated to perform the directory operation in the VFS. The directory information is received and stored in the directory cache (block 2480, FIG. 24).

If the file system operation requires file data (e.g., open file, read file etc.), then the storage port determines whether the file is located in the data cache (block 2440, FIG. 12). If the file is stored in the data cache, then the file, or appropriate portion, is transferred from the storage port to the client requestor (block 2090, FIG. 12). Alternatively, if the file is not in the data cache, then the storage port generates a file download request to the storage cluster (block 2050, FIG. 24). In response to the storage cluster request, the storage port receives and subsequently caches the object file in the data cache (block 2060, FIG. 12). The object is then transferred from the storage port to the client requestor (block 2090, FIG. 12).

End User Network Storage System Access Method

Figure 25:
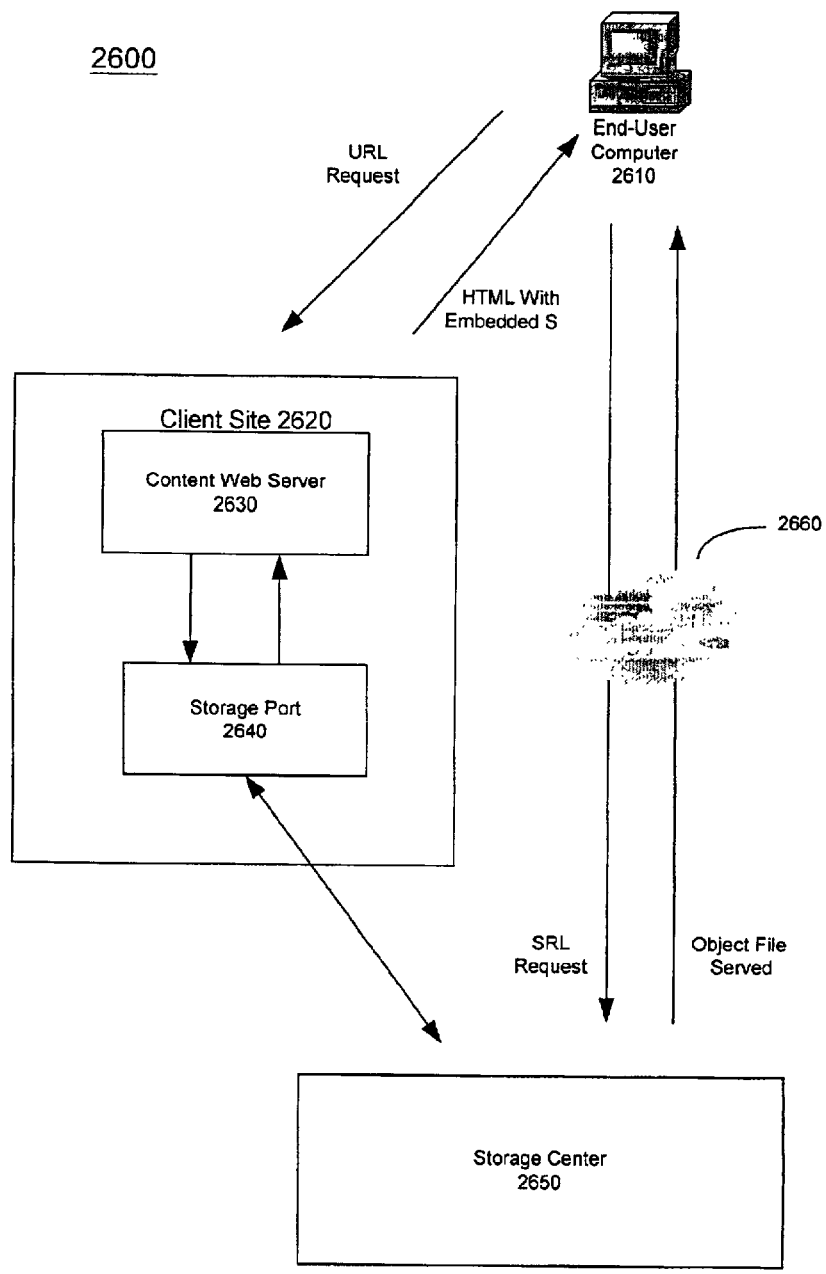
FIG. 25 is a block diagram illustrating one embodiment for using the storage port to directly download object files to the end-user.

In another embodiment, the storage port supports file downloads directly to the end-user or through a CDN partner. In one embodiment, the SRLs are directly embedded into the Web page HTML, and are sent to the end-user. This results in transferring objects directly from the storage center to the end-user browser. FIG. 25 is a block diagram illustrating one embodiment for using the storage port to directly download object files to the end-user. For this configuration, an end-user computer 2610 communicates with a client site 2620 and the storage center 2650. The client site 2620 maintains a web site. For this embodiment, the client site 2620 maintains a web site through a content web server 2630. However, any configuration of servers, including remote web site hosting, may be used without deviating the spirit or scope of the invention.

The content web server 2630 communicates with the storage port 2640, and in turn, the storage port 2640 communicates with the storage center 2650. As illustrated in FIG. 25, the end-user, through end-user computer 2610, generates URL requests to the client site 2620, and receives, in return, HTML with one or more embedded SRLs. Using the embedded SRLs, the end-user computer 2610 generates SRL requests directly to the storage center 2650 over a wide area network 2660. In response, the storage center 2650 serves object files directly to the end-user computer 2610.

Figure 26:
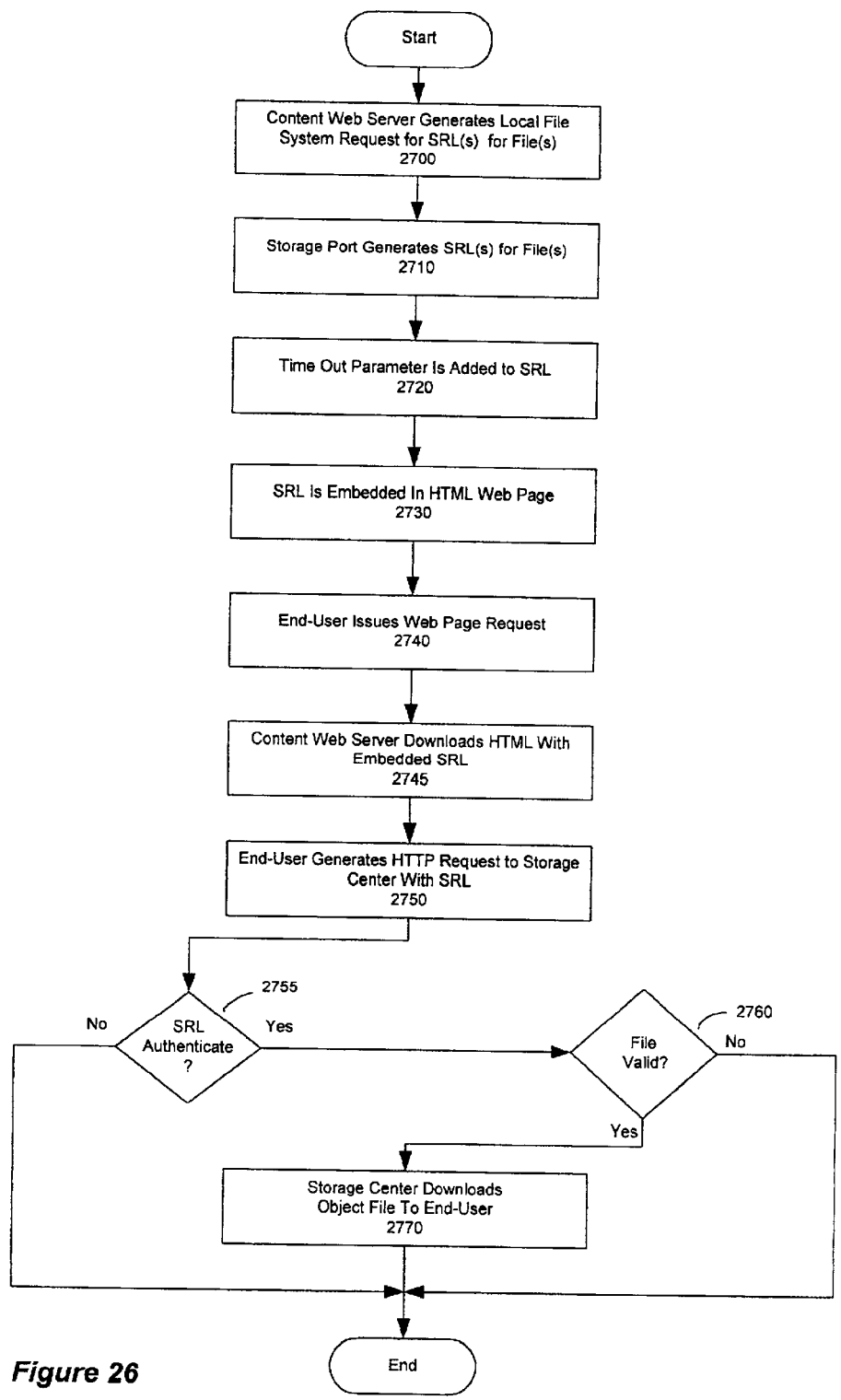
FIG. 26 is a flow diagram illustrating one embodiment for directly downloading object files to an end-user.

FIG. 26 is a flow diagram illustrating one embodiment for directly downloading object files to an end-user. The client site (e.g., content web server) generates local file system requests for SRL(s) corresponding to file(s) (block 2700, FIG. 26). The file(s) contain content that the client desires to embed in the web page. In one embodiment, the storage port dynamically generates the SRL(s) in response to the request from the content web server (block 2710, FIG. 26). In one embodiment, a time-out parameter is added to the SRL(s) (block 2720, FIG. 26). The time-out parameter permits a client to specify a period of time that the SRL is valid (i.e., a period of time that the end-user may access the file). In one implementation, the time-out parameter specifies a period of time with a granularity in seconds.

The SRL(s) are embedded in the HTML of the client's web page (block 2730, FIG. 26). The end-user issues web page requests to the client site (block 2740, FIG. 26). The content web server then downloads the requested HTML with the embedded SRL(s) (block 2745, FIG. 26). With the embedded SRL, the end-user generates HTTP requests to the storage center (block 2750, FIG. 26). If the SRL(s) do not authenticate at the storage center, then the storage center transmits an error message to the end-user (block 2755, FIG. 26). If the SRL(s) do authenticate, then the time-out parameter is checked to determine whether the file access is valid (block 2760, FIG. 26). If the SRL is not valid (i.e., the time-out parameter is out of range), then the operation is ceased (block 2760, FIG. 26). If the SRL is within the specified time range, then the storage center downloads the object file to the end-user (block 2770, FIG. 26).

The storage port 2640 acts as a file system cache. For this embodiment, the storage port contains the client's SRL files stored in a standard NFS or CIFS directory format. Each NFS or CIFS file contains the corresponding SRLs, and the SRLs contain the unique file identifier and the SRL authentication certificate.

In one embodiment, to deliver the SRLs to the end-user, the network file system utilizes a second directory, in addition to the directory for the object files, that shadows the object file directory. The client uses the second directory to obtain shadow files. A shadow file contains an SRL to identify an object file of the network storage system. In one embodiment, to embed the SRL into the web page HTML, the client reads the contents of the shadow file for the corresponding object file. In one embodiment, the shadow file is generated during an upload operation. The client may access a shadow file by mounting the second directory. For example, a client may specify, for the file "foo.text", the following directory-filename:

storagefilesystem:/export/dir/foo.text.

The client uses this directory and filename to access the contents of the object file, "foo.text." To obtain the SRL for the example file "foo.text", a client mounts a different directory, such as the following example directory:

storagefilesystem:/SRL/dir/foo.text, wherein, the SRL file contains a unique file identifier and the SRL authentication certificate for the file, "foo.text." To deliver the SRL to the end-user, the client reads the contents of a shadow file for the corresponding object file, and publishes the SRL to the user.

Client Private File System Directory

The network storage system of the present invention also supports using an existing private file directory to access the storage system. For this embodiment, the network storage system customer (e.g., client) may desire to use their own file structure in conjunction with the network storage system's file system. In other embodiments, a client of the network storage system may wish to develop a file system to track additional information beyond that information tracked using NFS or CIFS.

Figure 27:
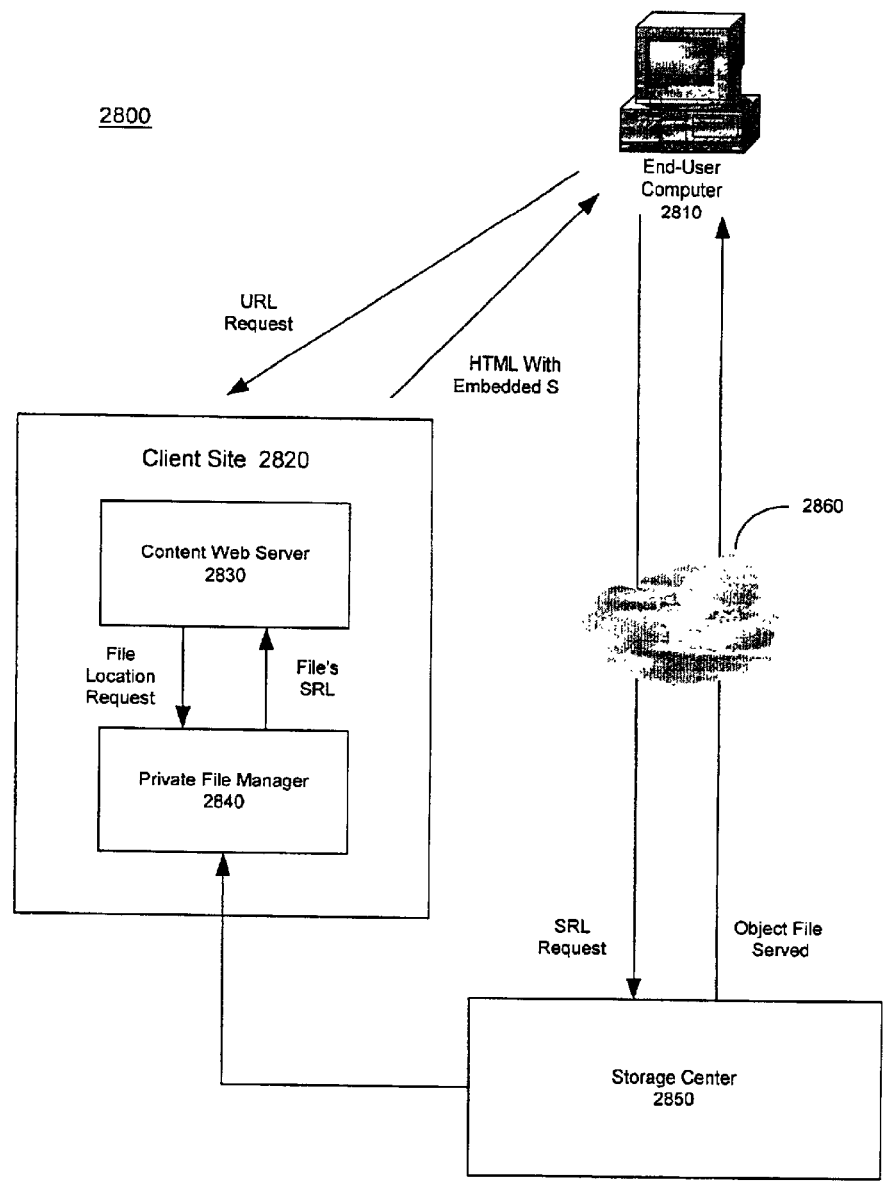
FIG. 27 is a block diagram illustrating one embodiment to interface a storage center to a client's private file directory system.

FIG. 27 is a block diagram illustrating one embodiment to interface a storage center to a client's private file directory system. In one embodiment, the storage port at the client site 2820 is replaced with a private file manager 2840. For this embodiment, the private file manager 2840 generates SRLs for object files using a unique file identification assigned to the user file at the time of upload, as well as using a shared secret to authenticate file system operations. As shown in FIG. 27, the content web server 2830, operating at the client site 2820, generates file system requests to the private file manager 2840. In turn, the private file manager 2840 issues SRLs corresponding to the object files that are the subject of the request. In one embodiment, the client supplies their own unique ID at the time the client uploads files to the storage center. In another embodiment, the client utilizes, in requests to download files, the object finger print returned by the storage center.

As shown in FIG. 27, the end-user, through end-user computer 2810, generates URL requests to the client's web site. In turn, the client site 2820 returns HTML with embedded SRLs. With the embedded SRLs, the end-user computer 2810 generates SRL requests, over a wide area network 2860, to the storage center 2850. In turn, the storage center 2850 serves object files identified by the SRL.

Figure 28:
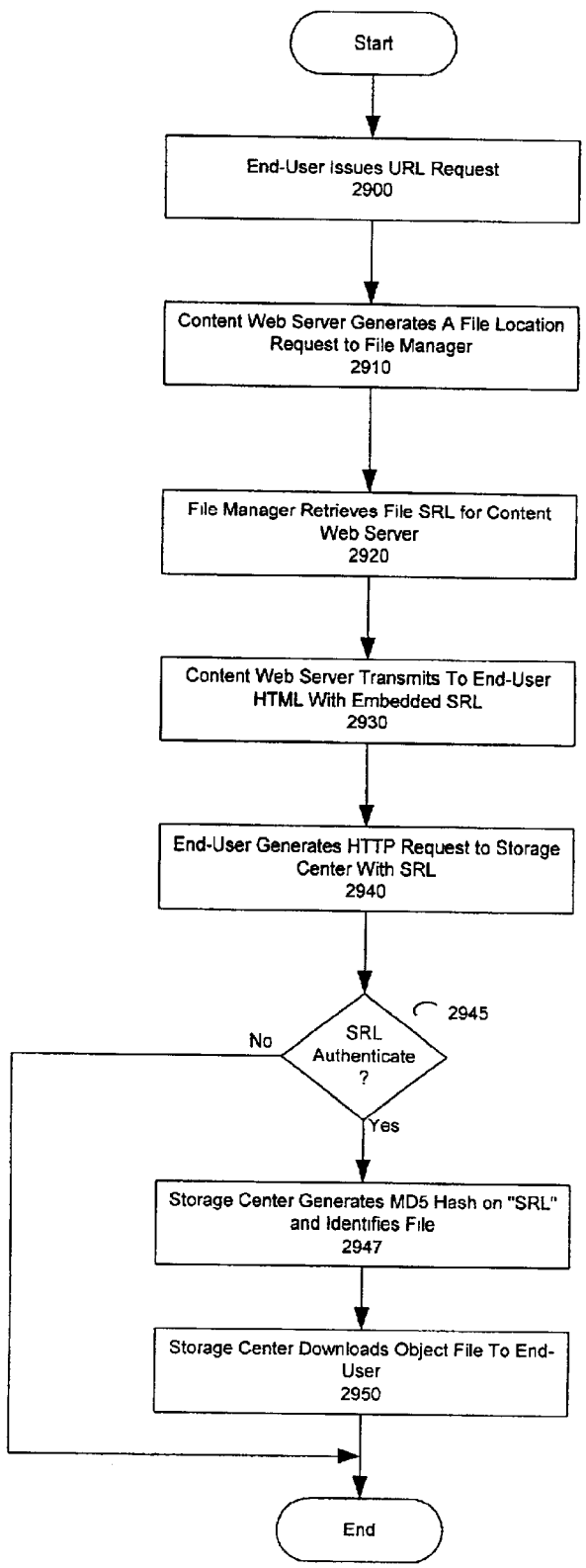
FIG. 28 is a flow diagram illustrating one embodiment for accessing object files in a storage center using a client's private file system.

FIG. 28 is a flow diagram illustrating one embodiment for accessing object files in a storage center using a client's private file system. The end-user issues the URL requests to the client web site (block 2900, FIG. 28). In response, the client (e.g., content web server) generates file location requests to a file manager (block 2910, FIG. 28). In general, the file manager services requests to issue SRLs corresponding to files in the client's private file system. A client may use any type of file system in conjunction with the network storage system. All that is required is that the client's private file system issues SRLs for files managed by the client's private file system. The file manager retrieves the SRL for the file associated with the HTML, and delivers the file to the content web server (block 2920, FIG. 28). The content web server then transmits to the end-user HTML with the embedded SRL (block 2930, FIG. 28). Thereafter, the end-user generates HTTP requests to the storage center with the SRL (block 2940, FIG. 28). If the SRL does not authenticate, then the storage center issues an error message to the user. Alternatively, if the SRL authenticates, then the storage center generates an MD5 hash on the client supplied unique file ID to identify the file (block 2947, FIG. 28). The storage center thereafter downloads the object file to the end-user (block 2950, FIG. 28)

For the client's private file system access method, the client maintains a mapping between unique filenames and SRLs. In one embodiment, the unique filename is not obtained from an MD5 hash operation, but is a unique filename. Thus, the network storage system utilizes a technique to differentiate between MD5 file names, derived from the contents of the object file, and client unique file names. In one embodiment, to differentiate between these two types of file names, the network storage system assigns different storage fingerprint identifiers. For a filename generated by an MD5 hash operation on the contents of the object file, the file is designated "128 bits.MD5." To identify a customer unique filename, the file is designated as "MD5.UFID" (i.e., where "MD5" is the client's unique file name). This convention permits the network storage system to differentiate between the twp types of file identifiers, and allows the customer to interface with the network storage system by only designating unique file names.

Failover Architecture

Figure 29:
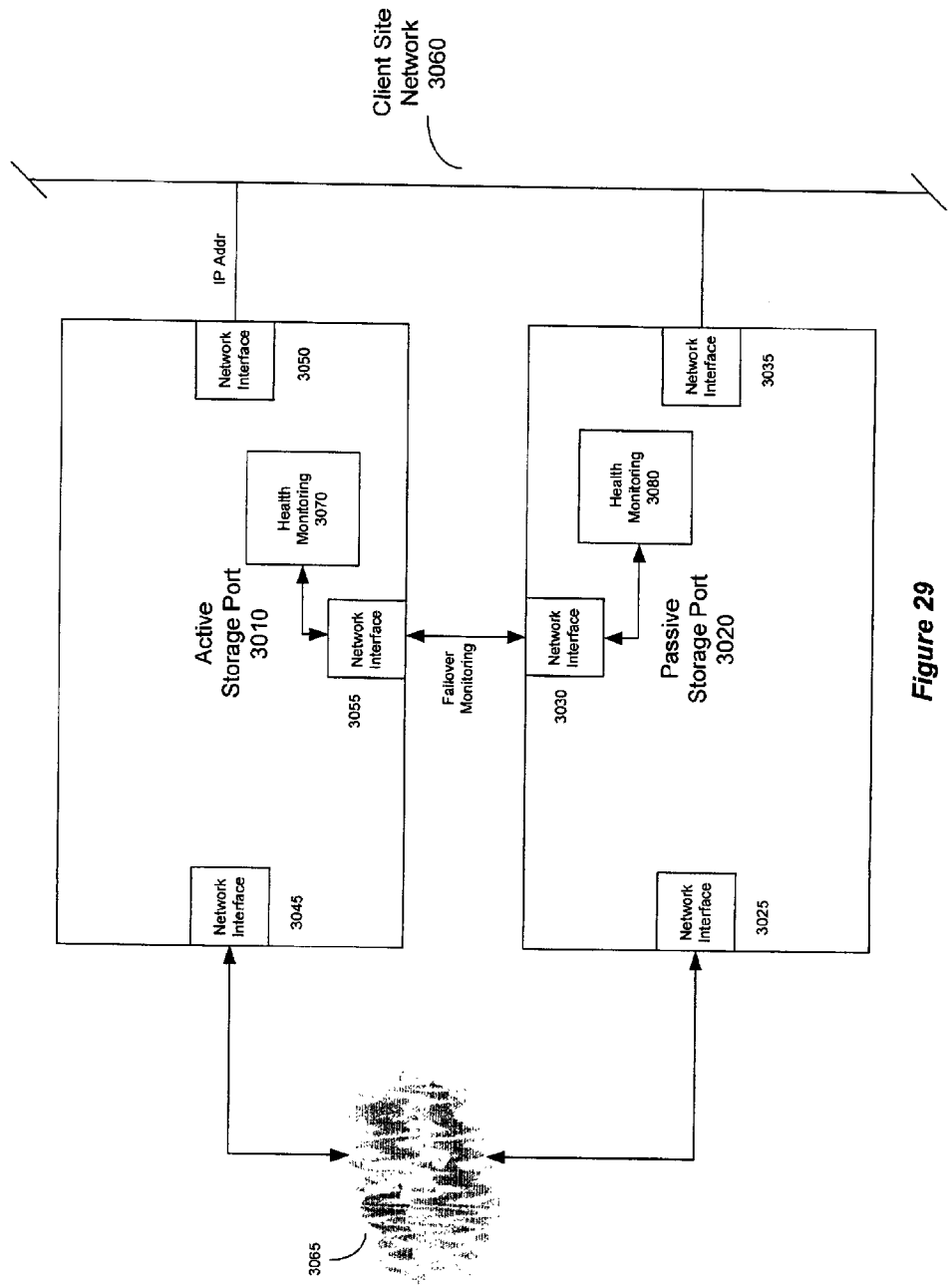
FIG. 29 is a block diagram illustrating one embodiment for a storage port fail over configuration.

In one embodiment, the storage port supports failover or failsafe architectures. FIG. 29 is a block diagram illustrating one embodiment for a storage port fail over configuration. For purposes of explanation, FIG. 29 illustrates a fail over configuration with two storage ports. However, the storage port fail over configuration may be extended to any "2N" fail over configuration. For this embodiment, the fail over configuration includes an active storage port 3010 and a passive storage port 3020. Each storage port includes a plurality of network interface cards. Both the active storage port 3010 and passive storage port 3020 communicate to storage center(s) over wide area network 3065, through network interface cards 3045 and 3025, respectively. The active storage port 3010 and passive storage port 3020 also communicate to the client site network via network interface cards 3050 and 3035, respectively. As shown in FIG. 29, the client accesses the active storage port 3010 over client site network 3060 using IP Addr.

For the embodiment of FIG. 29, a third network interface card is contained on both the active storage port 3010 (3055) and passive storage port 3020 (3030) to communicate between the devices for fail over monitoring. The active storage port 3010 operates as current storage port at the client site. The passive storage port 3020 monitors the health of the active storage port 3010. Specifically, active storage port 3010 includes health monitoring 3070 that continually executes a process to ascertain the health of the active storage port 3020 (e.g., health of the CPUs, hard disk drives, etc.). For this embodiment, the passive storage port 3020 queries the active storage port 3010 for health status. If a condition occurs in the active storage port 3010 that warrants a fail over condition, then the passive storage port 3020 becomes the active storage port (i.e., the passive storage port is used to interface the client site to storage center(s)).

In one embodiment, to support fail over, one IP address is used for the NFS/CIFS export. For this embodiment, a standard IP switch over scheme may be utilized. Specifically, when a fail over condition occurs, the passive storage port 3020 assumes the IP address of the active storage port 3010. The health monitoring 3070 and 3080 include both active and passive processes, so that if a fail over condition occurs, the passive storage port may execute the active storage port process.

Figure 30:
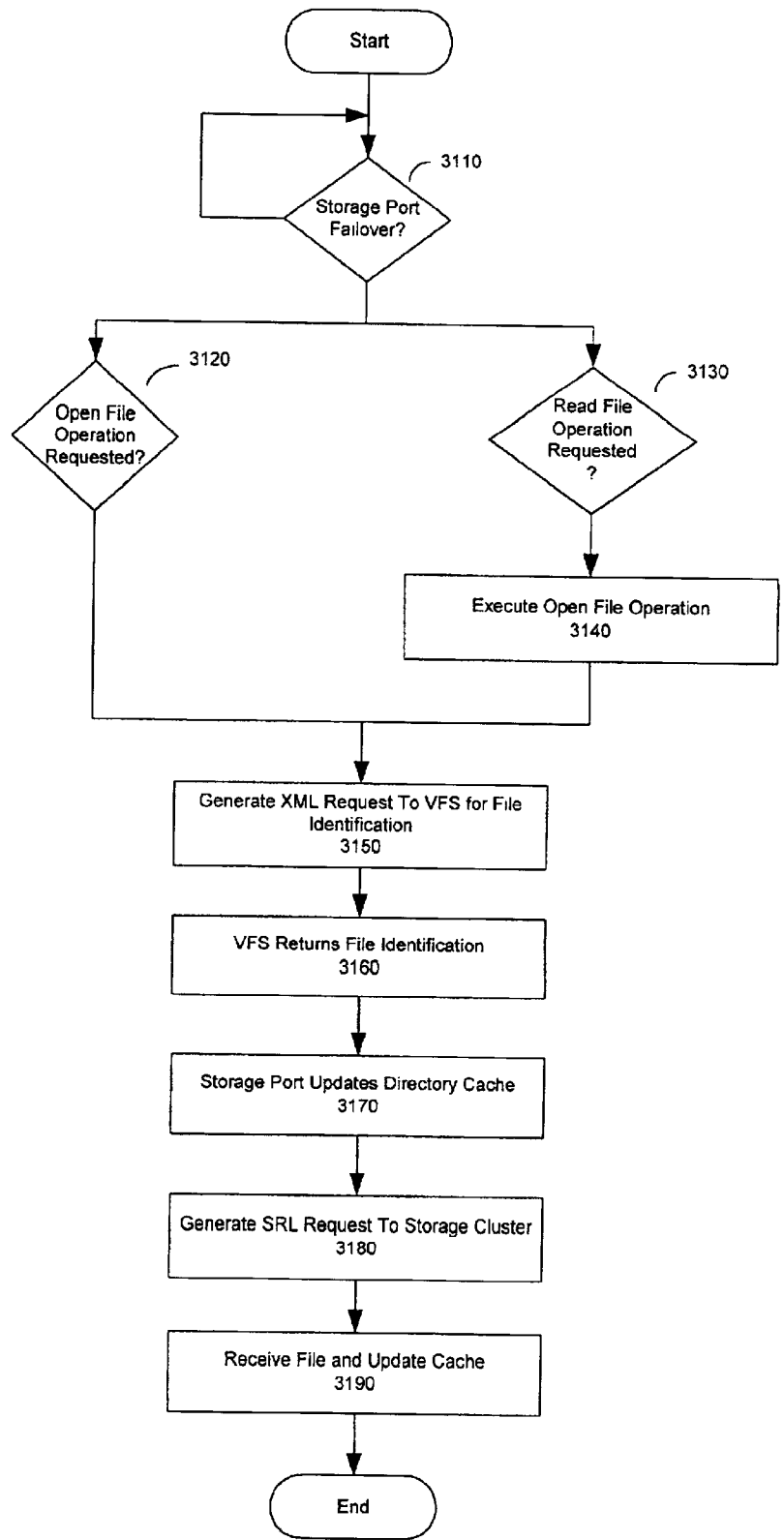
FIG. 30 is a flow diagram illustrating one embodiment for a storage port fail over process.

FIG. 30 is a flow diagram illustrating one embodiment for a storage port fail over process. When a storage port fail over occurs, the new storage port does not contain any directory information in its directory cache or any objects in its data cache. Thus, after a fail over operation, if a file is open and the storage port receives a read file request, the new storage port must execute a file open operation (blocks 3130 and 3140, FIG. 30). After the storage port receives the file identification information (e.g., SRL), the storage port generates a request to the storage center to obtain the object file, in order to transmit a block of object data in response to the read file request.

After a fail over condition, when a file is requested (block 3120, FIG. 30) or an open file operation is necessary, the storage port generates an XML to the VFS to obtain file identification information (block 3150, FIG. 30). In response, the VFS returns file identification information (block 3160, FIG. 30). With the file identification information, the storage port updates its directory cache (block 3170, FIG. 30). With the file identification information (e.g., SRL), the storage port generates a request to the storage center for the object file (block 3180, FIG. 30). In response, the storage center delivers the object file, and the storage port updates its data cache (block 3190, FIG. 30). If the storage center download operation was in response to a read request to the storage port, the read request delivers data as specified in the read request.

Network Storage System Dynamic Failover

In one embodiment, storage nodes monitor the health of their respective nodes (e.g., monitor hard disk drives, processor, network access, etc.). If the health of a storage node requires that the storage node should cease operation, then the storage cluster executes a fail over operation. In one embodiment, in a fail over operation, the storage node reports the failed status to the DOSMs, and the DOSMs update their state table. If this occurs, the DOSMs attempt to locate the replicated file at a different storage node (i.e., either locally or remotely).

Figure 31:
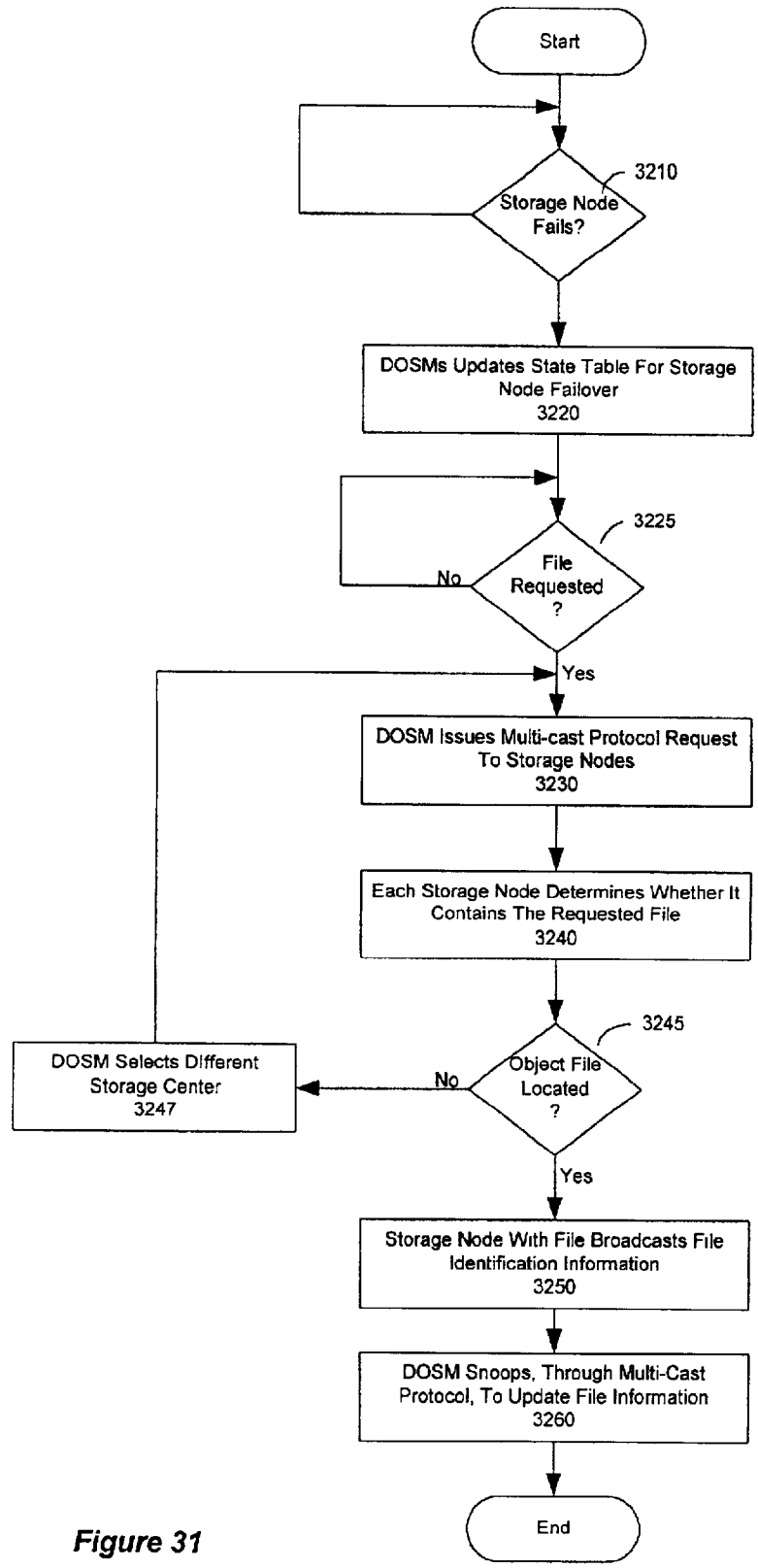
FIG. 31 is a flow diagram illustrating one embodiment for using the multicast protocol after a storage node fail over condition.

FIG. 31 is a flow diagram illustrating one embodiment for using the multicast protocol after a storage node fail over condition. If a storage node fails, then the DOSMs update and their state tables to indicate that the storage node is no longer in use (blocks 3210 and 3220, FIG. 31). If the DOSM receives a file request for a file previously stored on the failed storage node, then the DOSM, which received the download request, issues a multicast protocol request to the storage nodes (blocks 3225 and 3230, FIG. 31). In one embodiment, the DOSM may issue the multicast protocol request to local storage nodes (ie., storage nodes located at its storage center).

Each storage node that receives the multicast request determines whether it contains the requested object file (block 3240, FIG. 31). If none of the storage nodes contain the object file, then the DOSM may issue another multicast protocol request at a remote storage location (blocks 3245 and 3247, FIG. 31). Again, at the remote storage center, each storage node determines whether it contains the requested object file (block 3240, FIG. 31). In another embodiment, if the DOSM does not locate the file using the multicast protocol, the DOSM may query each individual storage node using the DOSP point-to-point protocol.

When a storage node locates the requested object file, the storage node broadcasts the file identification information using the multicast protocol (block 3250, FIG. 31). Each DOSM snoops, using the multicast protocol, to receive the file identification information (block 3260, FIG. 31). As illustrated in the process embodiment of FIG. 31, the multicast protocol may be used to synchronize file location information in the DOSMs in the event of a fail over condition.

Multi-Cast Protocol

The multi-cast protocol of the present invention supports the maintenance of file information in a distributed storage system. Since the network storage system consists of a plurality of storage nodes, the multicast protocol is used to track file information and synchronize file information throughout the network storage system. The tracking and maintaining of file and directory information includes maintaining information throughout geographically disparate storage centers. In one embodiment, the multi-cast protocol synchronizes cache information in the DOSMs. For example, if a new object file is loaded, the multi-cast protocol provides a means for all DOSMs in the network storage system to obtain information necessary to access the new object file. In addition, some file operations, including delete file or update file operations, require updating the DOSM lookup tables. Also, if a storage node fails, and a fail over condition is executed, the multi-cast protocol provides a means for the DOSMs to locate the file at the storage node the file has been replicated.

The Distributed Object Storage Protocol (DOSP)

In one embodiment, the DOSP includes daemon/master services and multicast-based monitoring communications. Communication between the daemon and master components is accomplished through a set of "request packets" and "response packets." The request packets consist of three major subcomponents: an opcode that specifies the type of request; a header implemented via a C++ specific structure that provides information about the data that follows; and data transmitted, if any.

Each operation has an associated operation code and a pair of structures: one for issuance of the request, and a second separate structure for return values. Once the receiver has received and processed the request (sent data, deleted file, etc) it then sends a response consisting of the appropriate "Out Structure" indicating the status of the request (SUCCESS, FAILURE, etc) and any required return values. Currently, there are six service operations supported by the DOSP: null, store file, retrieve file, retrieve file range, delete file, and get contents.

The null operation provides a framework to develop future modifications of the protocol and to test basic functionality of the master/daemon request/response interaction.

When a file is ready for storing, the DOSM client sends a request id, followed by a request header. It then sends the data to the dosd in a series of chunks, each of which is preceded by a DosdStoreHeader which gives the size of the next chunk to be read, and a field indicating whether this is the last packet to be sent.

When a file is being retrieved from the Storage Cluster, the DOSM client sends a request Id, followed by a request structure. The DOSD responds by first sending the size of the data, the data requested, and finally an Out structure with the return value of the operation.

The get contents operation is used to acquire the contents of the storage node as a character based stream. The after the "In Structure" is passed to the dosd, the dosd first returns the length of the stream of md5 hash/node&disk associations, followed by the stream of data, with the "Out structure" coming last.

The DOSP provides an extensible framework for any new services or additional functionality. There are essentially three steps to adding new functionality: defining a new pair of In/Out structures; assigning a new opcode, implementing a handle in the DOSM client; and adding a service handle for the dosd.

To facilitate gathering of information about the system, the DOSP provides several multicast-based services. In one embodiment, these services work in a manner very similar to the non-multicast aspect of the protocol. Specifically, requests consist of three parts: an opcode; a request In structure; and any additional data.

Responses consist of a response structure containing a RETURN value and any other return values required to satisfy the request. If data is streamed, a size field precedes the data, followed by the data, and then followed by the Out structure.

Since multicast traffic occurs on a completely separate port from point-to-point dosm/dosd traffic, the multicast In/Out structures are not multicast-specific. This makes it possible for the DOSM to query the entire dosd storage cluster or to query an individual machine with the same request/response structures and their associated operational sequencing.

One of the jobs of the DOSM is to monitor the current state of nodes in the cluster. There are several tools to facilitate this task. Primarily, the various dos daemons multicast heartbeats on a specific multicast port and group. The DOSM contains an option to query a specific disk, or all of the disks on a given a storage node. A "get disk state" function returns a value, and an array of disk state values (online, offline, down) with one entry per disk. A "get disk status" function contains an option to query a specific disk, or all of the disks on a given a node. The "get disk status" contains a RETURN value, and an array of disk statistics; one array per statistic (bytes free, bytes available, inodes used, inodes available, number of outstanding ops), with one entry per disk. The DOSP includes a load balancing function.

The DOSP includes a heartbeat function. This allows querying specific machines for a heartbeat in addition to providing system-wide tracking functionality via multicast methods.

Although the present invention has been described in terms of specific exemplary embodiments, it will be appreciated that various modifications and alterations might be made by those skilled in the art without departing from the spirit and scope of the invention.

What is claimed is:

1. A method comprising:

determining by a selected one of a plurality of control nodes, whether a client request to access an object is authentic, the determining being based upon whether a first certificate matches a second certificate, the first certificate being obtained from the client request, the second certificate being calculated based upon an encoded request from the client request;

if the selected one of the plurality of control nodes determines that the client request is authentic, determining, by the selected one of the plurality of control nodes, one of a plurality of storage nodes in which the object is located; and retrieving the object from the one of the plurality of storage nodes.

2. The method of claim 1, wherein:

the second certificate is based upon a first calculation and a second calculation, the first calculation comprising hashing an object fingerprint and a key to yield a first result, the second calculation yielding the second certificate and comprising hashing the first result and the key.

3. The method of claim 2, further comprising:

generating, based upon the client request, the first certificate and the object fingerprint.

4. The method of claim 1, wherein:

the selected one of the plurality of control nodes is selected by a level four switch.

5. The method of claim 4, wherein:

the level four switch selects the selected one of the plurality of control nodes based on availability of the selected one of the plurality of control nodes to retrieve the object.

6. The method of claim 2, wherein:

the object fingerprint identifies the object.

7. The method of claim 1, wherein:

the determining of the one of the plurality of storage nodes is based upon examination by the selected one of the plurality of control nodes of a file table at the one of the plurality of control nodes.

8. The method of claim 7, further comprising:

broadcasting by the selected one of the control nodes a broadcast request for the object to the plurality of storage nodes.

9. An apparatus comprising:

a selected one of a plurality of control nodes to determine whether a client request to access an object is authentic, based upon whether a first certificate matches a second certificate, the first certificate being obtained from the client request, the second certificate being calculated based upon an encoded request from the client request; and the selected one of the plurality of control nodes being capable of, if the selected one of the plurality of control nodes determines that the client request is authentic, determining one of a plurality of storage nodes in which the object is located, and retrieving the object from the one of the plurality of storage nodes.

10. The apparatus of claim 9, wherein:

the second certificate is based upon a first calculation and a second calculation, the first calculation comprising hashing an object fingerprint and a key to yield a first result, the second calculation yielding the second certificate and comprising hashing the first result and the key.

11. The apparatus of claim 10, wherein:

the selected one of the plurality of control nodes is capable of generating, based upon the client request, the first certificate and the object fingerprint.

12. The apparatus of claim 10, wherein:

the object fingerprint identifies the object.

13. The apparatus of claim 9, further comprising:

a level four switch to select the selected one of the plurality of control nodes.

14. The apparatus of claim 13, wherein:

the level four switch is capable of selecting the selected one of the plurality of control nodes based on availability of the selected one of the plurality of control nodes to retrieve the object.

15. The apparatus of claim 9, wherein:

the selected one of the plurality of control nodes is capable of determining the one of the plurality of storage nodes based upon examination by the selected one of the plurality of control nodes of a file table at the one of the plurality of control nodes.

16. The apparatus of claim 15, wherein:

the selected one of the control nodes is capable of broadcasting a broadcast request for the object to the plurality of storage nodes.

* * * * *